(12) United States Patent
Miller

(10) Patent No.: US 9,101,866 B2
(45) Date of Patent: Aug. 11, 2015

(54) ROOM AIR PURIFIER

(76) Inventor: Gregory R. Miller, Washington, MO (US)

(*) Notice: Subject to any disclaimer, the term of this patent is extended or adjusted under 35 U.S.C. 154(b) by 526 days.

(21) Appl. No.: 13/373,500

(22) Filed: Nov. 16, 2011

(65) Prior Publication Data

US 2012/0137876 A1   Jun. 7, 2012

Related U.S. Application Data

(60) Provisional application No. 61/414,216, filed on Nov. 16, 2010, provisional application No. 61/414,209, filed on Nov. 16, 2010, provisional application No. 61/414,230, filed on Nov. 16, 2010.

(51) Int. Cl.
| | |
|---|---|
| *B01D 46/46* | (2006.01) |
| *B01D 46/00* | (2006.01) |
| *B01D 46/10* | (2006.01) |

(52) U.S. Cl.
CPC ............ *B01D 46/0043* (2013.01); *B01D 46/10* (2013.01); *B01D 2279/50* (2013.01)

(58) Field of Classification Search
CPC ............................ B01D 46/0043; B01D 46/10
USPC .................... 55/419, 471; 95/23; 96/407, 417
See application file for complete search history.

(56) References Cited

U.S. PATENT DOCUMENTS

| | | | |
|---|---|---|---|
| 3,618,659 A | 11/1971 | Rawal | |
| 4,336,748 A * | 6/1982 | Martin et al. | 454/235 |
| 4,940,475 A | 7/1990 | Yaeger | |
| 5,099,836 A | 3/1992 | Rowland et al. | |
| 5,564,626 A | 10/1996 | Kettler et al. | |
| 5,884,500 A | 3/1999 | Wetzel | |
| 6,221,314 B1 | 4/2001 | Bigelow | |
| 6,500,387 B1 | 12/2002 | Bigelow | |
| 6,783,578 B2 * | 8/2004 | Tillman, Jr. | 96/224 |
| 6,960,241 B1 | 11/2005 | Slenz | |
| 7,105,037 B2 | 9/2006 | Olander et al. | |
| 7,326,387 B2 * | 2/2008 | Arts et al. | 422/186.3 |
| 7,332,006 B2 | 2/2008 | Kim et al. | |

(Continued)

FOREIGN PATENT DOCUMENTS

WO   WO 2006/083323 A2   8/2006

OTHER PUBLICATIONS

Safe Room with IQAir Air Purifiers with Duct Kits, AllergyBuyersClub.com, webpage print date Oct. 22, 2008, 7 pgs.

(Continued)

*Primary Examiner* — Duane Smith
*Assistant Examiner* — Sonji Turner
(74) *Attorney, Agent, or Firm* — Morgan, Lewis & Bockius LLP

(57) ABSTRACT

A room air purifier is provided is provided that has a housing that defines a floor supply duct inlet, a room air inlet, and an outlet. An air mixing chamber within the housing is in direct communication with said room air inlet and said floor supply duct inlet. A filter is disposed in the housing. A fan is disposed in said housing between the outlet of the filter and the outlet side of the filter. An air channel panel is disposed in a filter inlet area between the air mixing chamber and the filter. Various sensors may be deployed to control temperature, and to prevent unpurified air from exiting the room air purifier. Optionally, an additional wall supply inlet may be placed in fluid communication with the air mixing chamber to provide a second extra-room source of air.

25 Claims, 24 Drawing Sheets

(56) References Cited

U.S. PATENT DOCUMENTS

| | | |
|---|---|---|
| 7,578,734 B2 * | 8/2009 | Ahmed et al. .............. 454/334 |
| 8,118,236 B2 | 2/2012 | Lestage et al. |
| 8,568,521 B2 | 10/2013 | Sakashita et al. |
| 2004/0058637 A1 | 3/2004 | Laiti |
| 2005/0164625 A1 | 7/2005 | Kim et al. |
| 2006/0021375 A1 | 2/2006 | Wetzel et al. |
| 2006/0177356 A1 * | 8/2006 | Miller .......................... 422/121 |
| 2008/0076345 A1 | 3/2008 | Ahmed |
| 2009/0023376 A1 * | 1/2009 | Miller .......................... 454/230 |
| 2010/0044447 A1 | 2/2010 | Miller |

OTHER PUBLICATIONS

Airehaven, Inc., International Search Report and Written Opinion, PCT/US2014/055912, Nov. 25, 2014, 8 pgs.

* cited by examiner

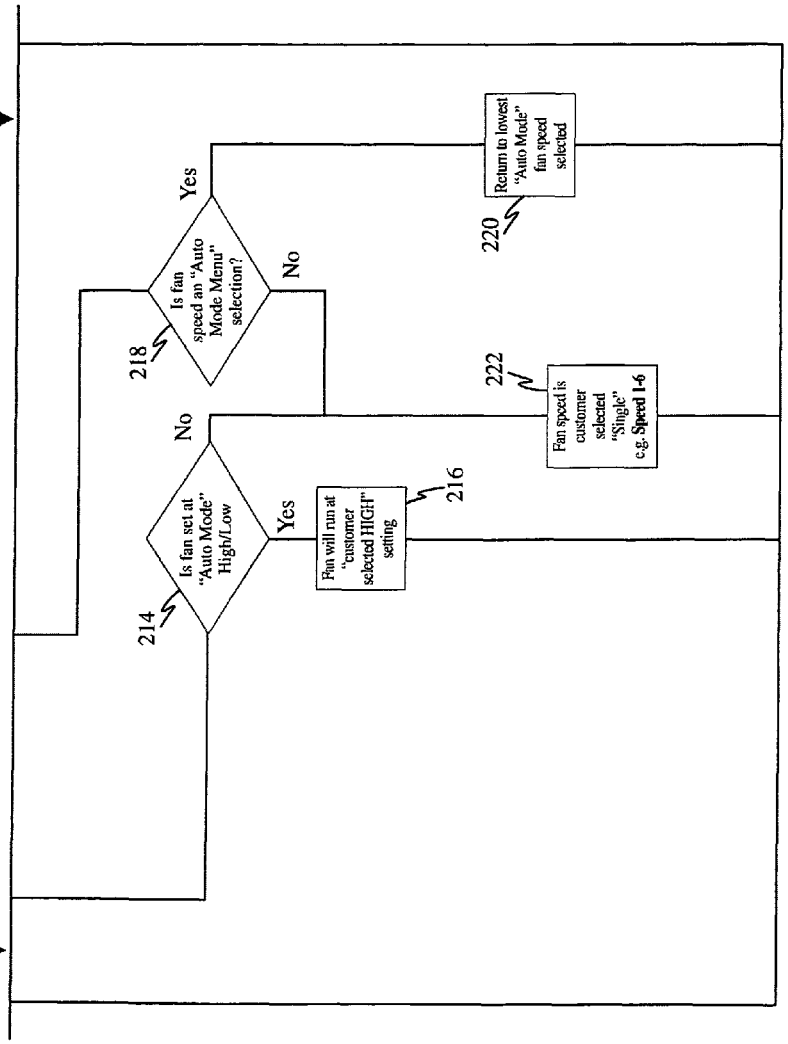

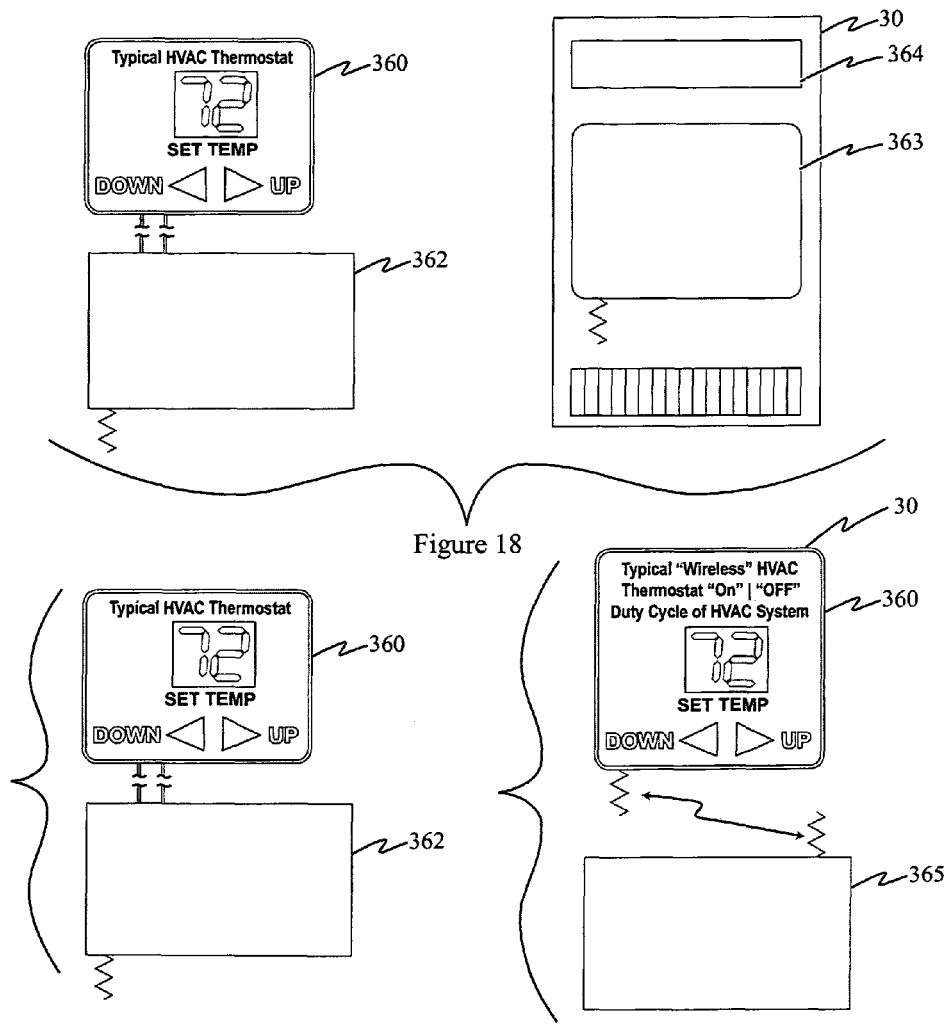
Figure 18
Figure 19A
Figure 19B
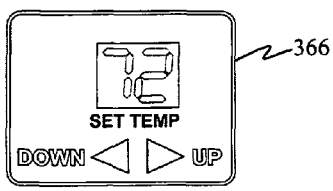
Figure 19C

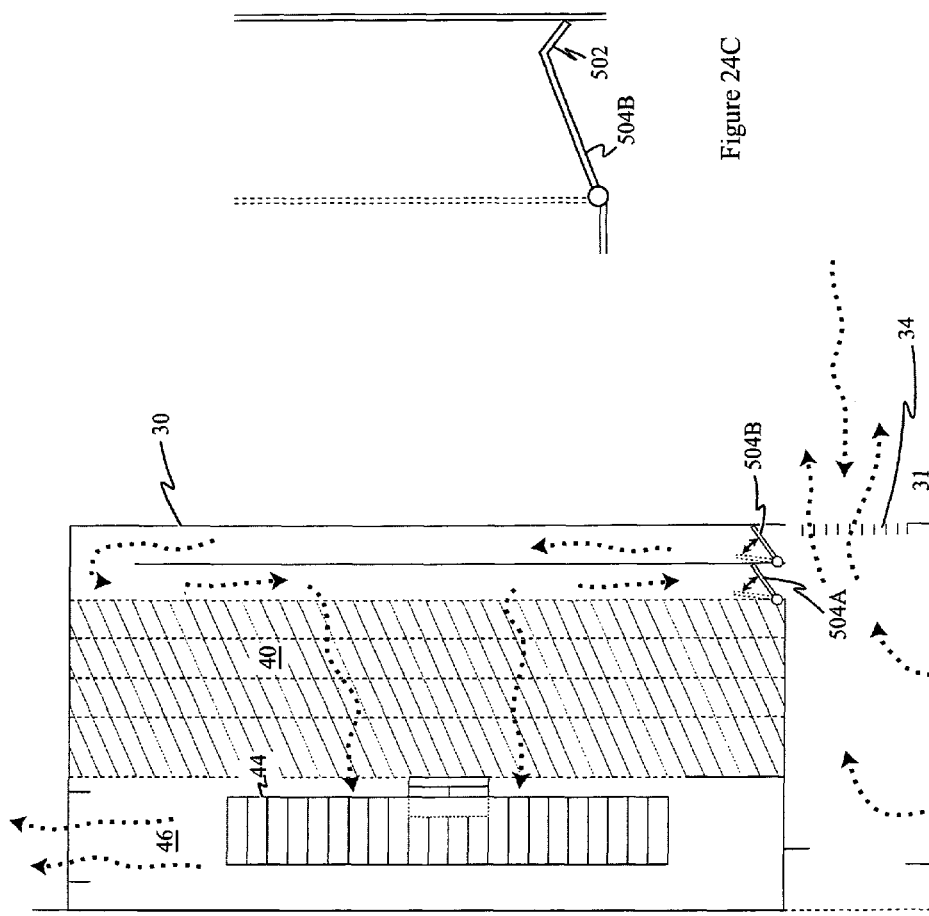

ROOM AIR PURIFIER

CROSS-REFERENCE TO RELATED APPLICATIONS

This application claims priority to U.S. Provisional Patent Application No. 61/414,216 titled "Compact Room Air Purifier System with Flexible High Efficiency Room Temperature Control and Outside Ambient Air Supply Means and Management," filed Nov. 16, 2010. This application claims priority to U.S. Provisional Patent Application No. 61/414,209 titled "Air Flow and Air Distribution in a New Style Compact 'Source Control' Type Room Air Purifier," filed Nov. 16, 2010. This application claims priority to U.S. Provisional Patent Application No. 61/414,230 titled "Compact Style Source Control Type Room Air Purifier Controls," filed Nov. 16, 2010.

STATEMENT REGARDING FEDERALLY SPONSORED RESEARCH

Not Applicable.

APPENDIX

Not Applicable.

BACKGROUND OF THE INVENTION

1. Field of the Invention

This invention relates to purification of air and, more specifically, to creating a positive pressure environment with purified air.

2. Related Art

There are two main types of room air purifiers today. One type works well with all forms of forced air heating and or cooling systems commonly found in roughly 80% of the homes in the United States (US Census).

The other type works in an atypical, controlled room environment. More specifically, a room without open doors, open windows, drafts and or forced air supply ducts. The following information supports this position.

According to the U.S. EPA "portable room air cleaners generally contain a fan to circulate the air and use one or more of the air-cleaning technologies discussed above. They may be an option if a home is not equipped with a furnace or a central air-conditioning system." This information was recently published in the EPA's Residential Air Cleaning Devices publication.

Furthermore, The AHAM (Association of Home Appliance Manufactures) CADR (Clean Air Delivery Rate) long accepted standard for Evaluating the performance of portable air cleaners, is overdue in recognizing the specificity in the EPA's new position. AHAM does indicate, in the CADR certificate, "Portable air cleaners will be much more effective in rooms where all doors and windows are closed." Unlike the EPA's new revelation, AHAM continues to fall short and does not recognize, what is, perhaps, the largest source of contaminated air entering a room, the supply duct of "a furnace or a central air-conditioning system" (EPA).

AHAM and the EPA worked together decades ago to create the CADR testing and certification program and have updated the testing protocol as recently as 2006 and 2008.

Indoor air quality ranks among the top 5 environmental risks to humans in the United States. The costs are measured in tens of millions of people suffering from allergies and asthma and more formidable airborne VOCs, gases, and other contaminants. The cost to the United States is tens of billions of dollars in health care and lost productivity at work. There are too many losses to cover here in detail. The EPA has an exhaustive list of the consequences of poor indoor air quality.

Distinct from the existing two classes of air purifies, the air purifier disclosed in US Patent Application Publication No. 20090023376 represents a new class of room air purifier that effectively manages contaminated air from a forced air system and also manages air from the room. This device can also manage room air temperature by adding the proper amount of heating air or cooling air to a room utilizing only one supply duct.

Because most rooms have several supply ducts, uncontrolled ducts in the room should be closed. The air purifier unit will install and connect to (seal to) one supply duct and the expense of additional room air purifier units for a single room is typically not necessary.

This new air purifier will also manage air from any source outside of the room it can be connected to, and will also manage the ambient room air as well.

By design, the air purifier is capable of drawing a necessary amount of air continuously from any source outside of the room. Any in-room return air duct can be blocked or partially blocked, and the room will overflow with the additional air, and this excess air can flow out of a doorway, for example, thereby preventing untreated hallway air from entering the room through the open doorway. Drafts in the hallway are kept at bay and not allowed to circulate freely into the treated room.

The air purifier described is represented in the cut-away side view drawing in FIG. 1.

SUMMARY OF THE INVENTION

The present invention provides various ways of adjusting the mass flow rate of air entering a room air purifier through one or more inlets in order to provide positive air pressure for a room. The mass flow rate can be adjusted by increasing or decreasing the size of an inlet using a variety of approaches, including dampers, louvers, fan speed, and partitioning. In addition, various control systems for managing the position of dampers, fan speed, and temperature are also provided by the present invention.

In addition, several safety features for protecting a room from contamination in a powered-off situation are also provided.

Further areas of applicability of the present invention will become apparent with reference to the following drawings, description and claims. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12B is a second portion of a flow chart governing the operation of the master control shown in FIG. 11.

FIG. 18 is a block diagram illustrating a controller located in a different room from a room air purifier of the present invention.

FIG. 19A is a block diagram in which an interface module of the present invention is wired to an existing HVAC controller.

FIG. 19B is a block diagram illustrating a wireless HVAC controller and a wireless interface module of the present invention.

FIG. 19C is a new wireless HVAC controller of the present invention.

FIG. 24B is a portion of a side section view of an alternative structure for the room air purifier of FIG. 24A, in which an air flow partition and matching dampers are introduced.

FIG. 24C is an enlarged view of a damper element shown in FIG. 24B.

DETAILED DESCRIPTION OF THE PREFERRED EMBODIMENTS

The following description of the preferred embodiment(s) is merely exemplary in nature and is in no way intended to limit the invention, its application, or uses.

Figure 1:
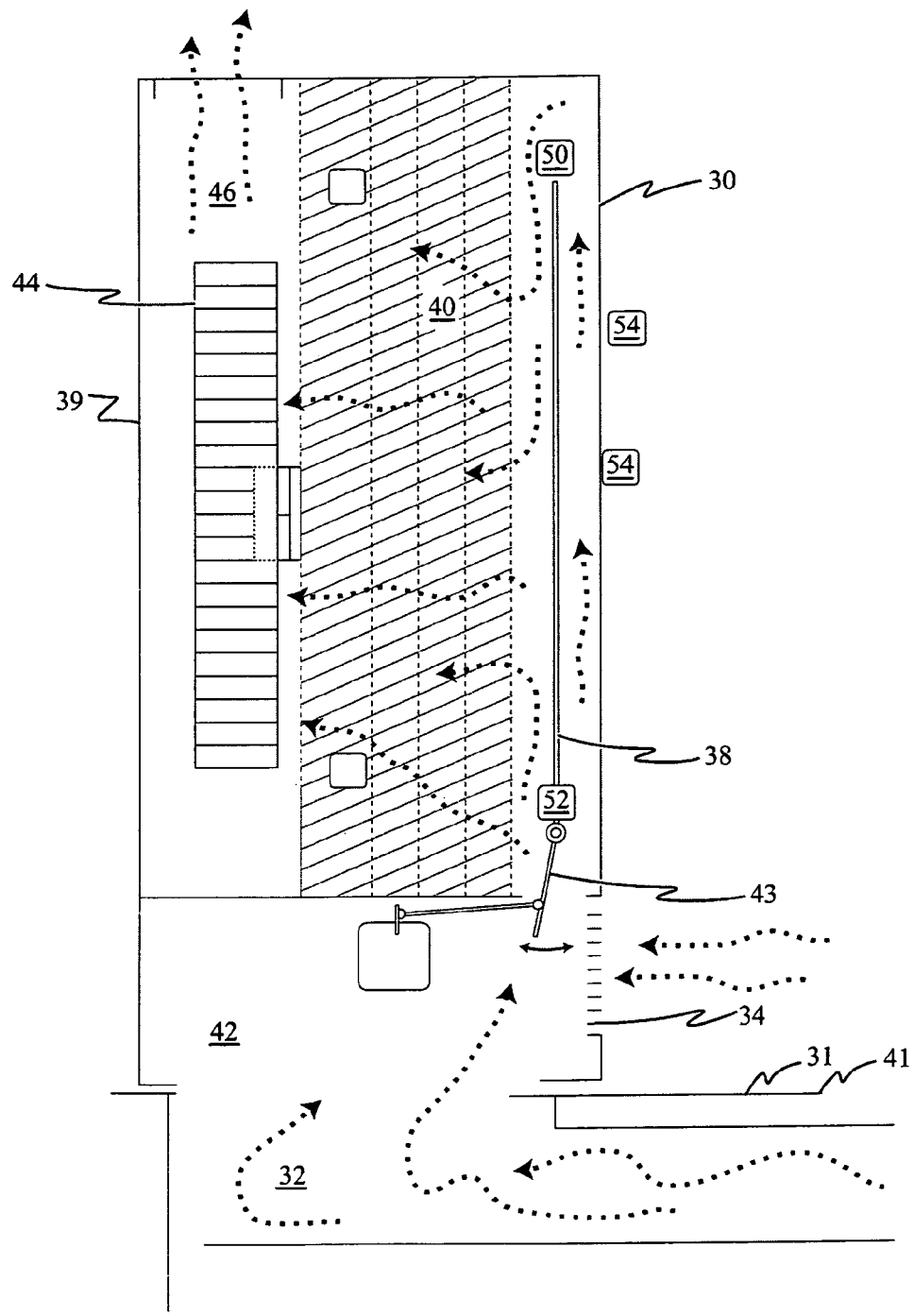
FIG. 1 is a side section view of one air purifier embodiment of the present invention.
Figure 3:
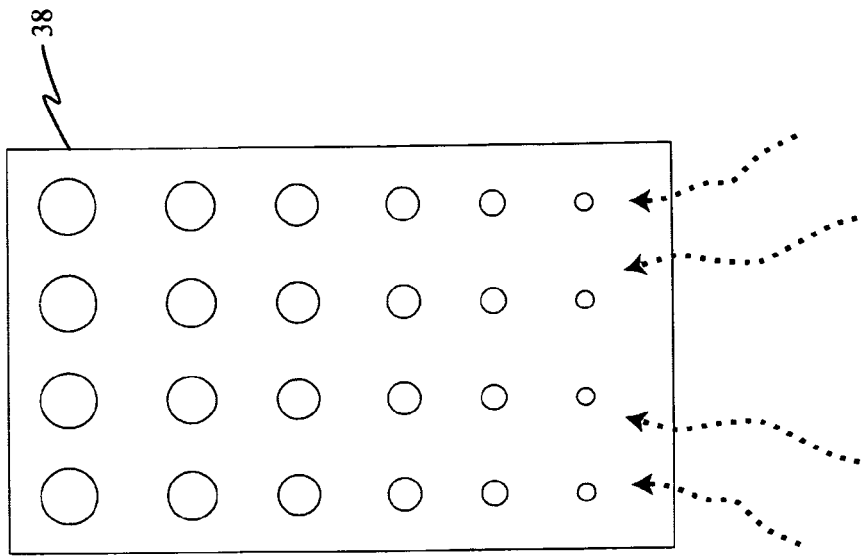
FIG. 3 is a second alternative air distribution panel shown in FIG. 1.
Figure 2:
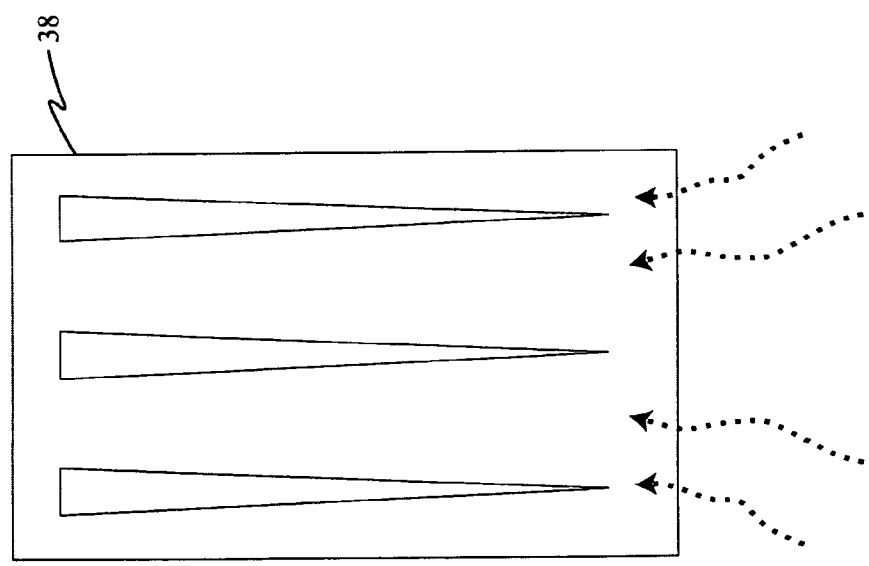
FIG. 2 is one possible air channel panel shown in FIG. 1.

In FIG. 1, a first embodiment of a room air purifier 30 of the present invention is shown. Room air purifier 30 is disposed on the floor 31 above floor supply duct 32. Room air purifier 30 is provided with a room air inlet 34. An air distribution panel 38 (alternatively referred to as an "air flow partition" in FIG. 24B) is spaced between one housing wall 39 and the inlet side of filter 40. Air distribution panel 38 can employ alternative structures. In one embodiment, air distribution panel is a solid panel. With a solid panel, it will be appreciated that air distribution panel 38 is spaced from the top of room air purifier 30 to allow air to flow around the top end of air distribution panel 38 for a "racetrack" air flow path (see also, FIG. 24B). In alternative embodiments, air distribution panel has a pattern of apertures, see FIG. 2 and FIG. 3, to modify the distribution of mass flow rate of air across the face of filter 40.

As shown in FIG. 1, filter 40 is preferably composed of multiple HEPA-type filters. Damper motor 42 controls the position of damper 43. Damper 43 is pivotally connected at one end to air distribution panel 38. In one position, damper 43 pivots to direct air flow entirely between housing wall 39 and air distribution panel 38. In an opposite position, damper 43 may be positioned to direct air flow between air distribution panel 38 and filter 40. In an intermediate position, damper 43 can allow air flow between housing wall 39 and air distribution panel 38 and simultaneously air flow between air distribution panel 38 and filter 40. It is recognized that a manually-actuated lever (not shown) may be used in lieu of damper motor 42 for articulating damper 43 between the first position and the second position.

Fan 44 draws air through floor supply duct 32 and room air inlet 34, through air distribution panel 38 and filter 40. The air then exits room air purifier 30 at purified air outlet 46.

Room air purifier 30 is further provided with a plurality of flow sensors 50, 52, disposed along the face of the inlet side of filter 40. These sensors 50, 52 measure and report information regarding air flow rate. Suitable flow sensors include a Honeywell brand model S & C AWM92100V, Omron brand model DSS D6F-P, Thorp tube style flow meters, and Erie Liter Meter type LM09 in combination with a flow limited orifice sized for up to two liters per minute relative flow readings. It is possible to use a single sensor 50 in lieu of more than one sensor. For example, the Honeywell sensor mentioned above with two interconnected flow sensing ports may be employed using a first length of tubing that extends to a first end of the face of filter 40, and a second length of tubing that extends to a second end of the face of filter 40.

Figure 7:
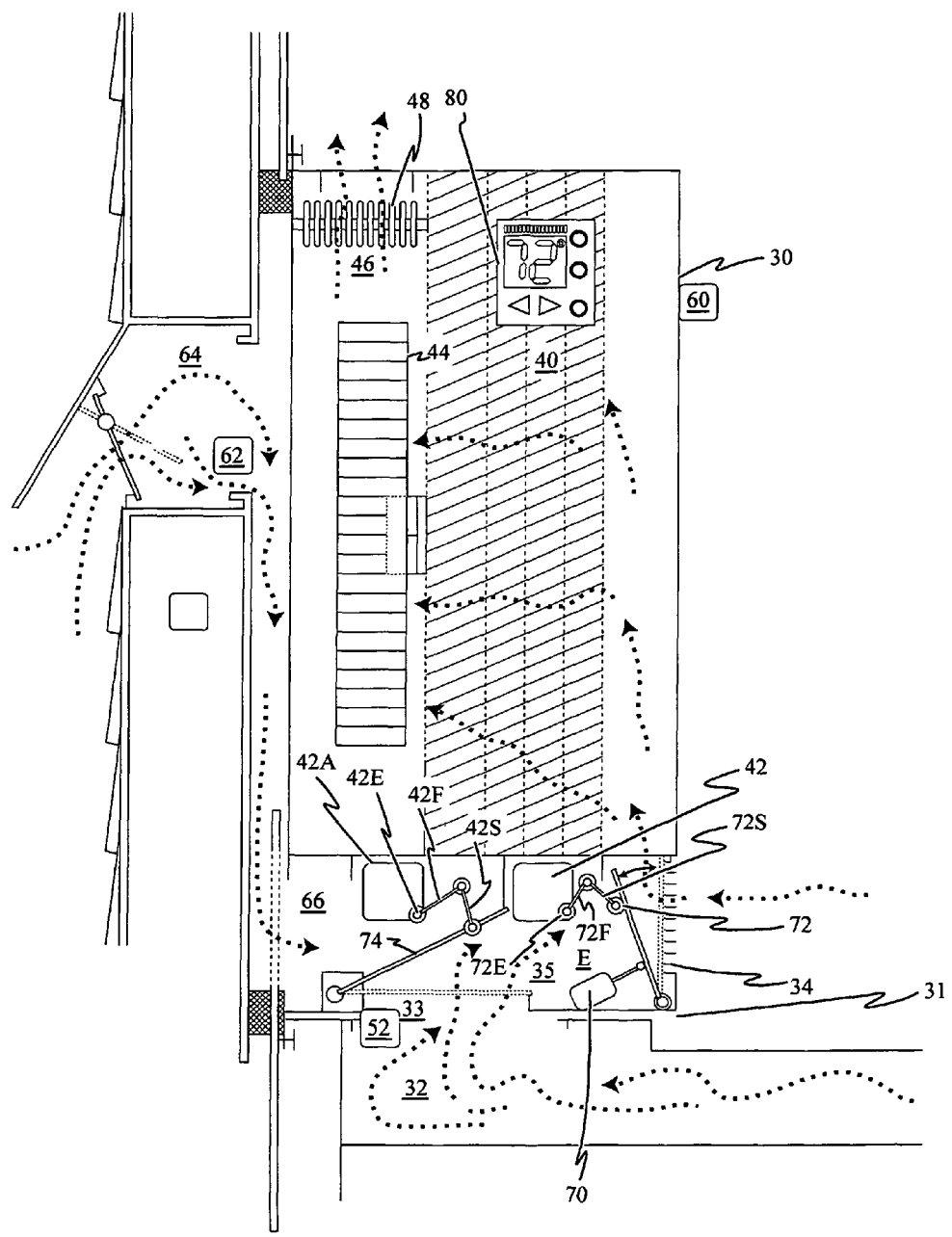
FIG. 7 is a side section view of an alternative embodiment of a room air purifier, having an inlet to outdoor ambient air, an inlet to a floor supply duct, and a room air inlet.

The air flow rate may be displayed on a controller 80 (FIG. 7). Based on flow rate information, controller 80 may automatically adjust the position of damper 43 using an incremental, iterative process to change the relative percentages of mass flow rate of air entering each of the channels created within the filter inlet area by air distribution panel 38 to achieve a more even mass flow rate of air across the face of filter 40. Alternatively, in the event of a lever-actuated damper, the displayed mass flow rate information may be considered by a user to move a lever in order to pivotally change the position of damper 43 to achieve the same result.

Alternate to the use of damper 43, air distribution panel 38 may be hinged at a distal end (the end proximate sensor 50), and movable at the end nearest mixing chamber 35 such that the movable end travels between a first position adjacent the inlet side of filter 40, and a second position adjacent the wall of the housing of room air purifier 30.

Figure 4:
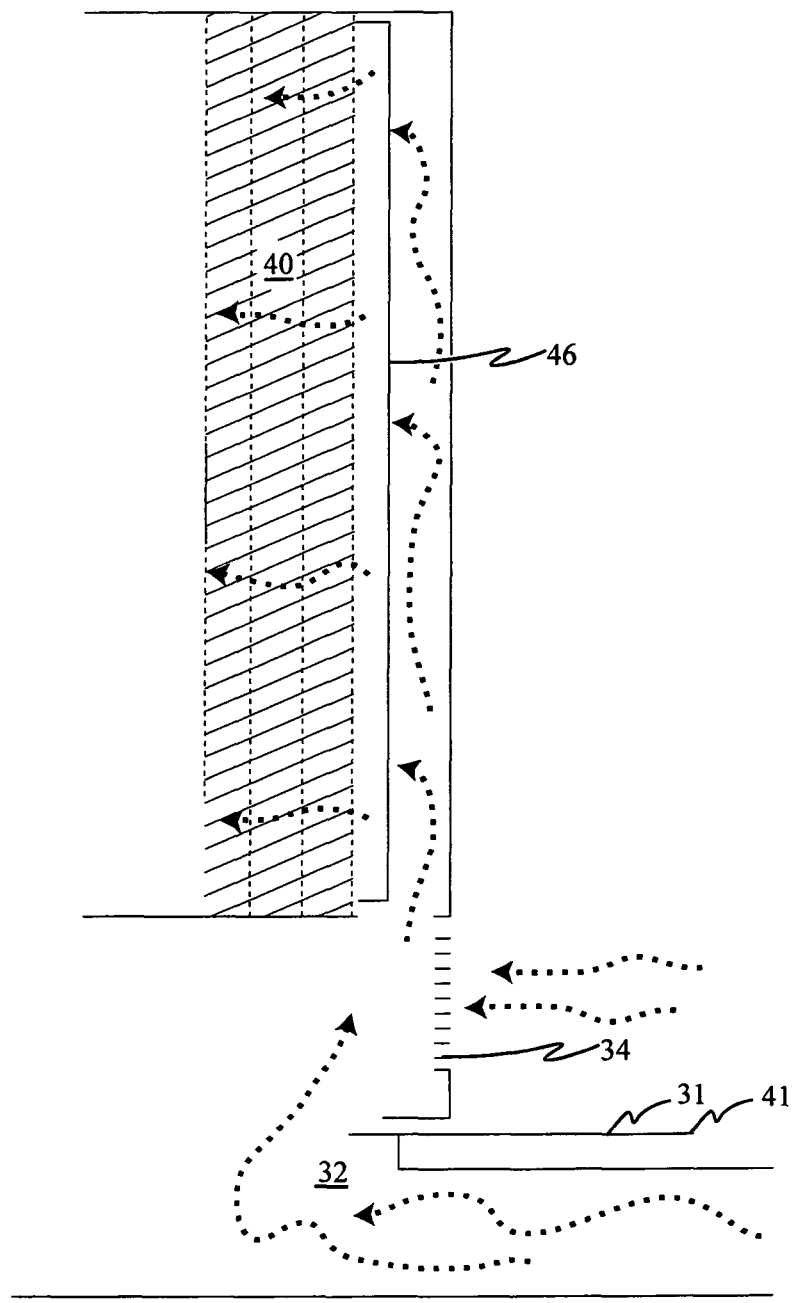
FIG. 4 is a side section view of a portion of a room air purifier illustrating an alternative air distribution panel structure shown FIG. 1.

Referring now to FIG. 4, an alternative structure is proposed in which air distribution panel 38 is disposed immediately proximate filter 40. In this embodiment, there is no damper motor 42 or damper 43. All of the air drawn by fan 44 is directed between housing wall 39 and air distribution panel 38, prior to being filtered.

Figure 5:
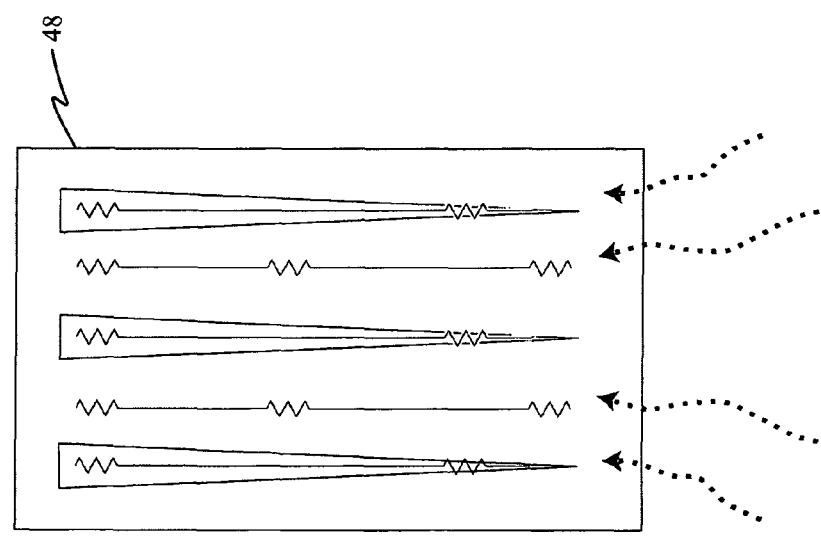
FIG. 5 is an illustration of one resistive heater layout for the heater shown in FIGS. 7, 9, and 10.

Referring now to FIG. 5, the air within room air purifier 30 can be heated using a resistor-type layout to evenly heat the air consistent with the mass flow rate. Specifically, a higher density of resistive units may be employed in areas with higher air mass flow rates.

Figure 6:
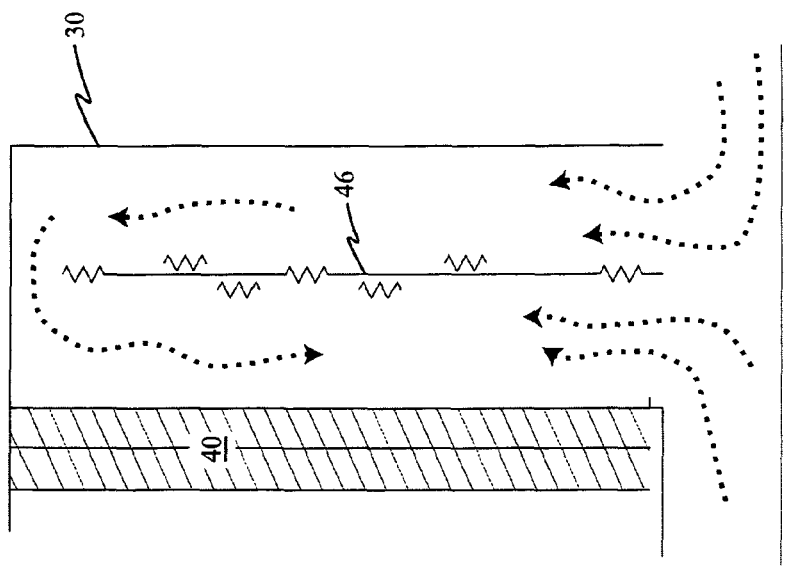
FIG. 6 is a side section view of an alternative construction of a room air purifier in which a heater is mounted to an air distribution panel of FIGS. 1, 4, and 24A.

Referring now to FIG. 6, heater 48 can be applied to one surface of air distribution panel 38. Heater 48 is a resistor-type heater. Preferably, heater 48 is a silicone heater mat, or a carbon-wire resistor.

Referring now to FIG. 7, air can enter through floor supply duct inlet 33, wall supply duct inlet 66 and room air inlet 34. Air entering through one, two or all three sources combines in chamber 35, also designated as Area E. The entire goal of the present invention is to prevent a mass flow rate of air that exceeds the ability of room air purifier 30 to keep untreated air directed toward the filter, and to prevent untreated air from escaping through room air inlet 34 backwards, into the room. This goal must be achieved despite the fact that the mass flow rate of air traveling through chamber 35 is highly variable. For example, when the HVAC system of the house turns on, a very large increase in mass flow rate of air entering chamber 35 is experienced. In addition, a strong storm or gust exterior to the home will also increase the mass flow rate of air entering into chamber 35.

This is accomplished by varying the speed of fan 44, by moving a first damper 72, and/or moving a second damper 74. The controller 80 of room air purifier 30 directs the speed of fan 44, the position of first damper 72, and the position of second damper 74 according to the flow chart of FIGS. 8A and 8B.

As an additional constraint on the operation of controller 80, a user may select a desired room air temperature and fan speed. Room air purifier 30 uses data gathered from a first temperature sensor 60 that senses the ambient room air temperature, a second temperature sensor 52 that senses the temperature of air issuing from floor supply duct 32, and a third temperature sensor 64 that senses the temperature of the air external to the home. Based on these temperature sensor readings, and based upon the user-set target temperature, the controller 80 makes adjustments in the positions of the first damper 72, second damper 74, and the speed of fan 44. It is further possible to incorporate a humidity sensor with each temperature sensor, thus providing the ability to balance the humidity within a room (by drawing from sources having more or less humidity depending on the ambient room air humidity), and avoid a rainout condition within the room. For temperature modification, heater 48 may be used to raise the temperature of air exiting through outlet 46.

With respect to the physical operation of first damper 72, shown in FIG. 7, first damper motor 42 pivots one end 72E of a two-bar linkage and, more specifically, one end of a first bar 72F, which forces movement of the second bar 72S, which is connected at its other end to first damper 72, thereby infinitely adjusting the position of first damper 72 between position 1 (room air inlet 34 completely open, floor supply duct inlet 33 and wall supply duct inlet 66 cracked open), and position 2 (room air inlet 34 completely closed, floor supply duct 32 and wall supply duct inlet 66 open).

All damper motors discussed herein preferably have a spring return. Suitable damper motors include a solenoid linear actuator, and electric motor, or a stepper motor. In the event a specific damper motor is unable to function properly in a power off situation, spring return linear actuator 70 is intended to return damper 72 to a first position to seal filter inlet area 43, to prevent air from reaching filter inlet area 43 in the event of power failure. Alternatively, a battery backup may be provided to provide temporary power sufficient to move damper motor 72 to allow for the closing off of filter area 43. At all times other than a power failure condition, it is critical to the invention that first damper 72 in position 1 be cracked open so that some mass flow rate of air is always able to flow into room air purifier 30. This ensures that room air purifier 30 will not only purify the air that ultimately discharges through outlet 46, but also maintains a positive pressure within the room so that the air within the room exits the room rather than allowing untreated air to enter the room.

In case of power failure, it is recommended that an additional spring return be employed to return dampers, 72, 74, to a position that seals the supply duct It is mentioned that, ideally, the door to the room is shut, while room air purifier 30 is in operation.

With respect to the physical operation of second damper 74 shown in FIG. 7, second damper motor 42A pivots one end 42E of a two-bar linkage, and, more specifically, one end of a first bar 42F, which forces movement of the second bar 42S, which is connected at its other end to first damper 72, thereby infinitely adjusting the position of second damper 74 between position 1 (floor supply duct inlet 33 completely open, wall supply duct inlet 66 completely closed), and position 2 (floor supply duct inlet 33 cracked open and wall supply duct inlet 66 completely open). It is preferred that second damper 74 be provided with a limit-stop 76 to prevent the over-travel of second damper 74 past the boundary of position 1 and position 2. In addition, in an alternative embodiment, position 2 may be modified such that floor supply duct inlet 33 is completely closed. This alternative embodiment while initially appearing to prevent the generation of positive pressure in the room, recognizes that additional mass flow rate of air can be generated by drawing air from wall supply duct 66. The essential characteristic is that room air purifier 30 is able to draw a mass flow rate of air from a source that is exterior to the room in order to provide positive pressure within the room, while simultaneously controlling temperature control to the treated room.

Importantly, the ability of the present invention to bring in outside air, filter it, and then use it to dilute existing volatile organic compound build-up, reduce concentrations of Radon gas, brings tremendous internal environmental advantages. Moreover, in some states, a temperate climate means that the ability to draw from outside air without having to heat or cool the air provides significant power savings for many months of the year.

Figure 8A:
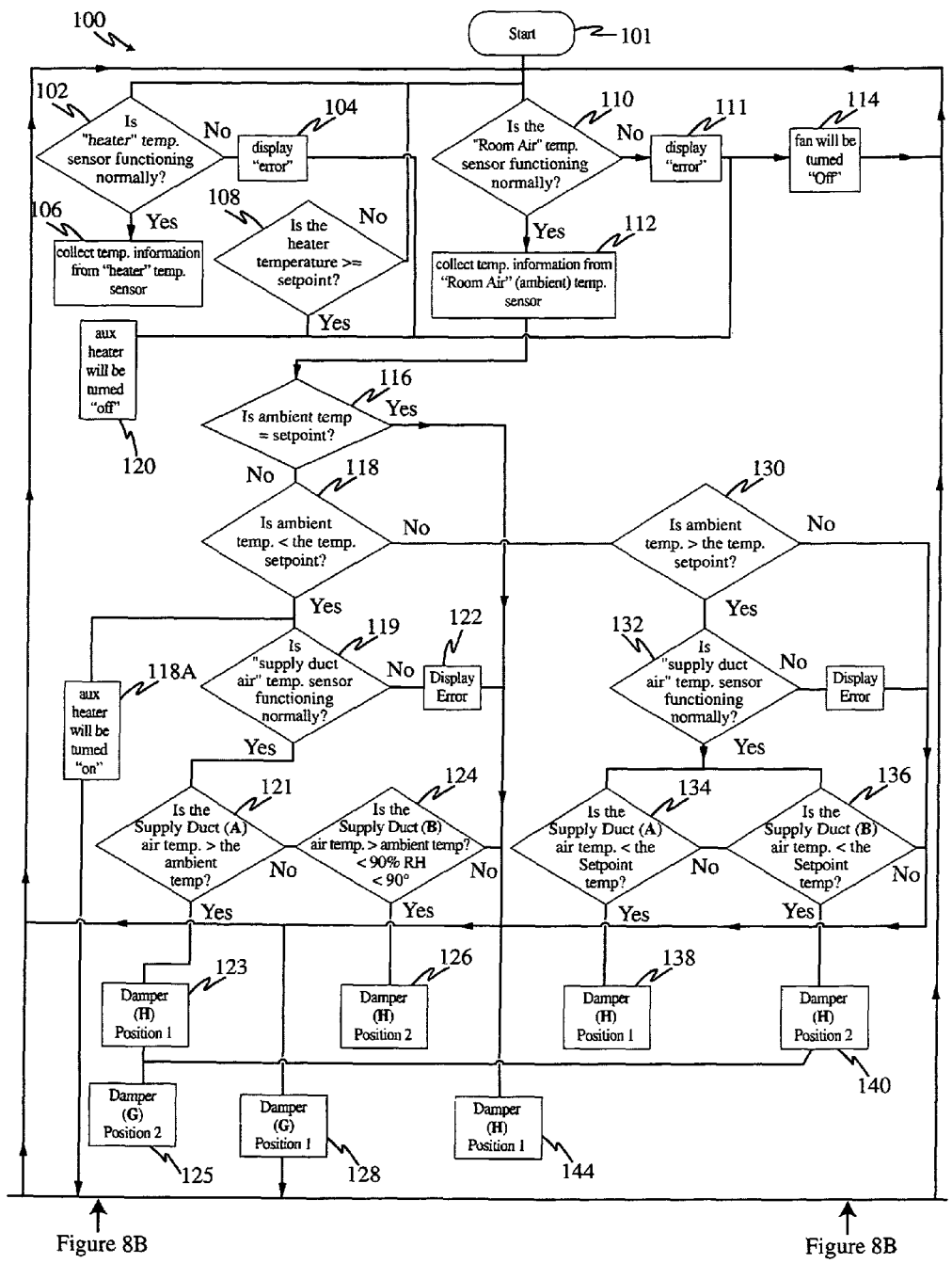
FIG. 8A is first portion of a flow chart governing the operation of a temperature and fan speed control unit shown in FIG. 7.
Figure 8B:
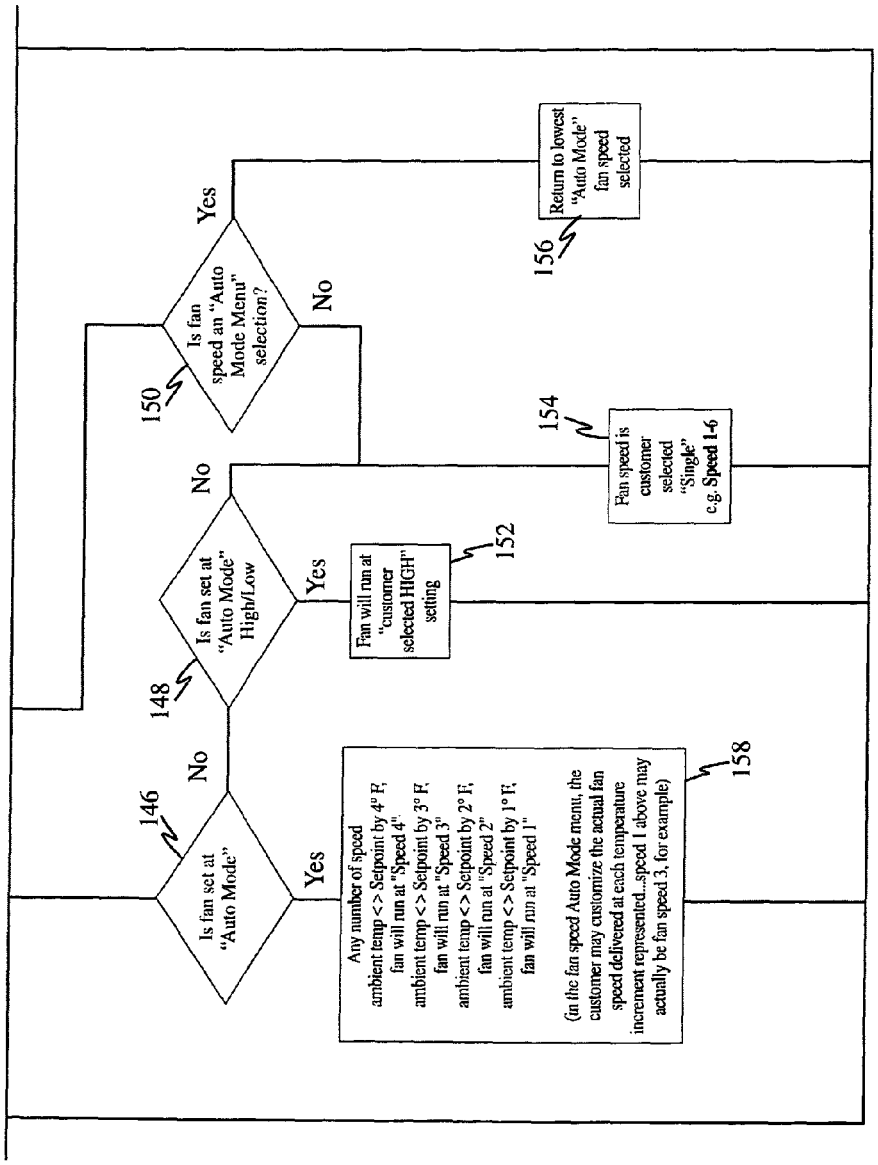
FIG. 8B is second portion of a continuation of the flow chart of FIG. 8A.
Figure 12A:
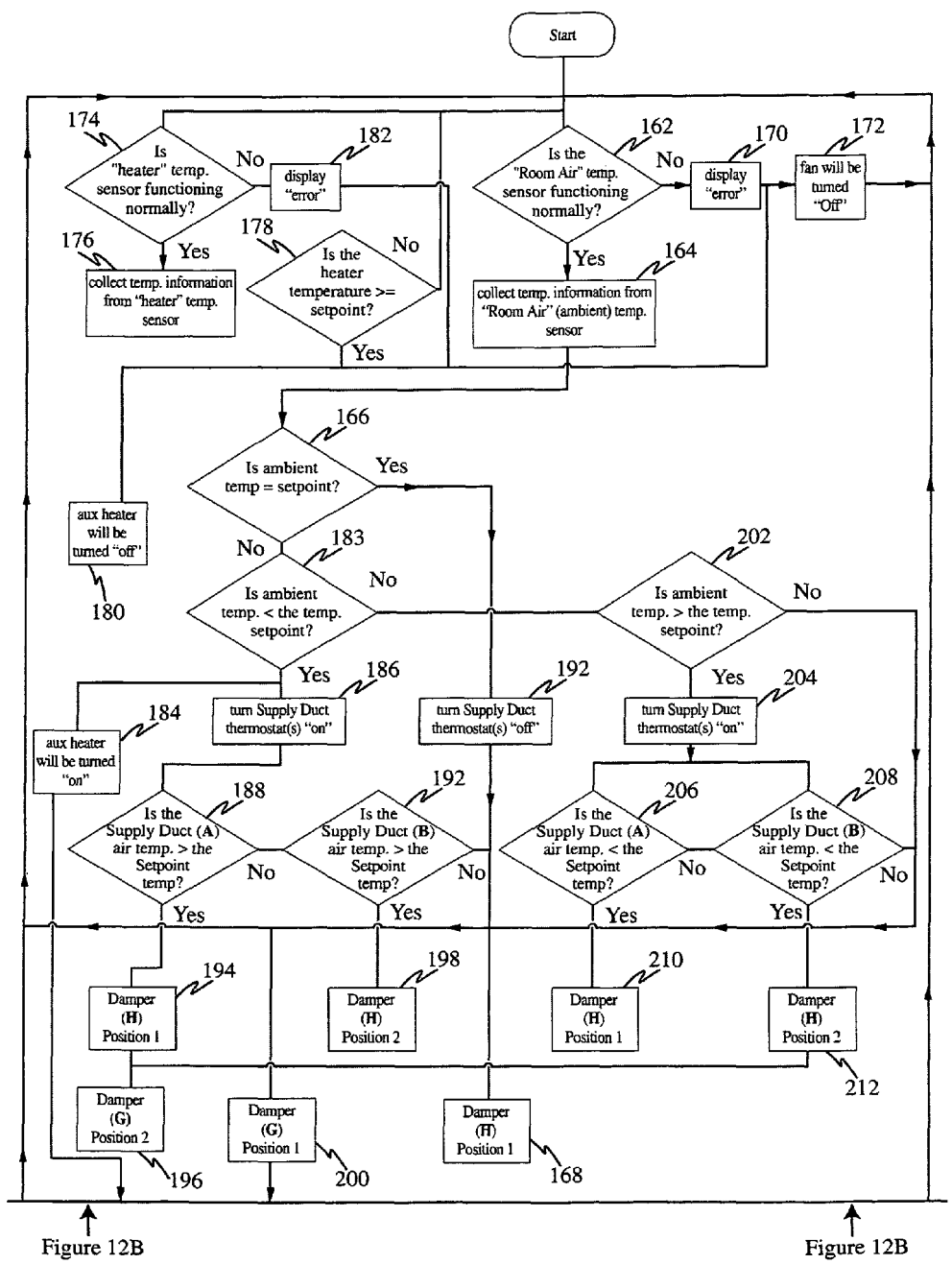
FIG. 12A is first portion of a flow chart governing the operation of the master control shown in FIG. 11.

Referring now to FIGS. 8A and 8B in which the operation of controller 80 of room air purifier 30 is set forth, certain diagnostic functions to ensure accurate component functionality are completed. These diagnostic steps are detailed at 101, 102, 104, 106, 108, 110, 111, 112, 114, 119, 122, 132 and 142. Next, temperature data is gathered and evaluated, as shown at 116, 118, 121, 124, 130, 134 and 136. Depending on the results of this evaluation, first damper 72 and second damper 74 are adjusted each between a position 1 and a position 2, as illustrated at 123, 125, 126, 138, 140 and 144. In addition, the process for fan speed adjustment is accomplished via the steps at 146, 148, 150, 152, 154 and 156. Overall, the control system of FIGS. 8A and 8B are focused on comparing user-input set points against the measured ambient temperature of each inlet. This is in contrast to the control approach of FIGS. 12A and 12B which focuses more on set points.

Certain controller rules are also implemented. The following rules are collectively referred to hereinafter as "Common Controller Rules." Specifically, regardless of customer-selected fan speed setting ("set point"), if the ambient temperature is less than or greater than the customer set temperature by 4° F. the fan will run at a speed 4 setting. If the ambient temperature is less than or great than set point by 3° F. the fan will run at speed 3 setting. If the ambient temperature is greater than or less than set point by 2° F. the fan will run at speed 2 setting. If the ambient temperature is less than or greater than set point by 1° F. the fan will run at speed 1 setting.

Figure 9:
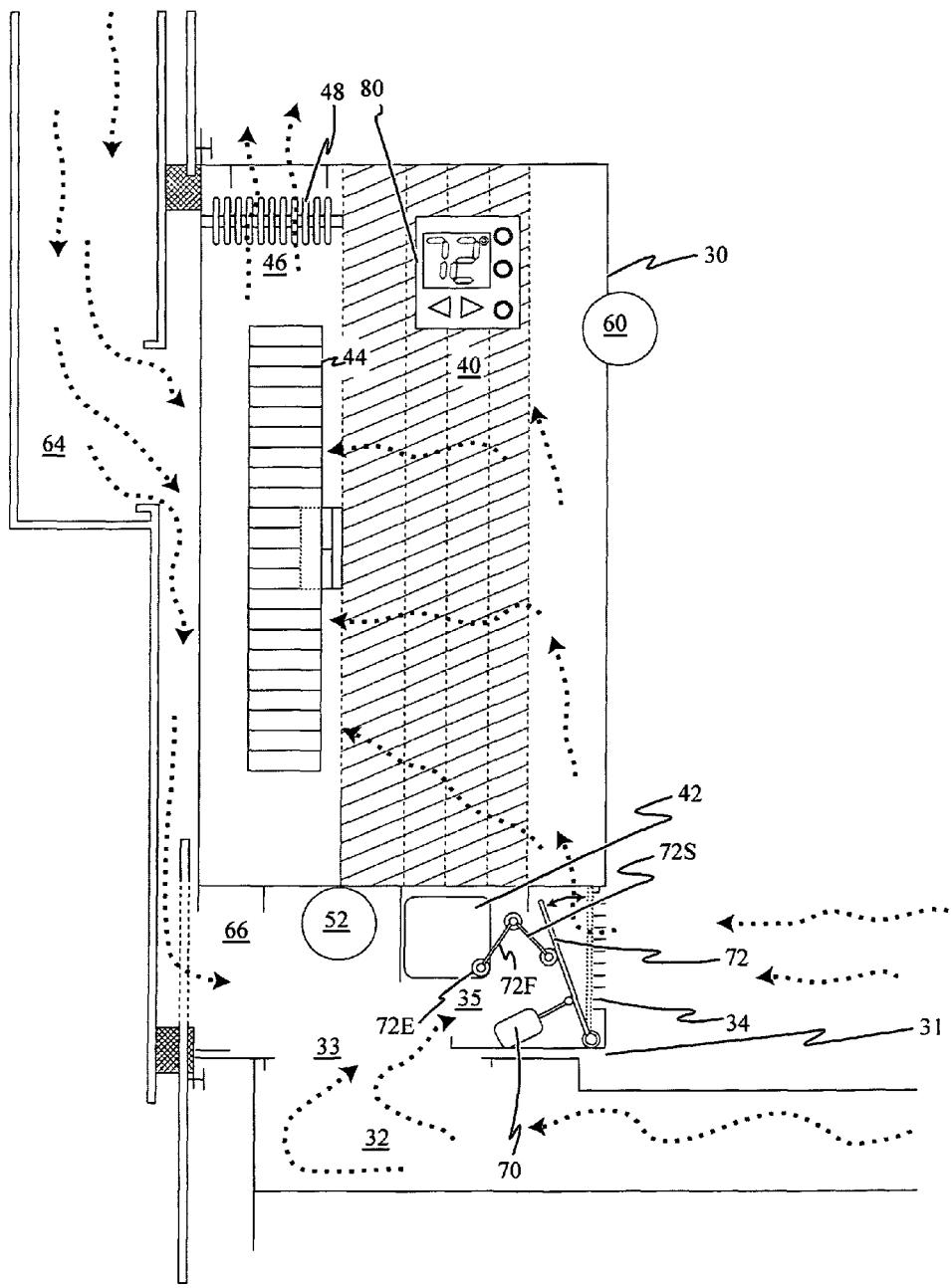
FIG. 9 is a side section view of a third room air purifier embodiment employing a single room air inlet damper.

Referring now to FIG. 9, a third room air purifier embodiment of the present invention is shown. In this embodiment, identical to FIG. 7, the room air purifier 30 has three inlets for drawing air, room air inlet 34, floor supply duct inlet 33, and wall supply duct inlet 66. In addition, the construction of the damper in FIG. 9, which controls and closes, air flowing through room air inlet 34 is identical to the construction in FIG. 7. The difference in the third embodiment is that the second damper 74 of FIG. 7, and associated mechanical elements such as a second damper motor 42A are omitted. Accordingly the embodiment shown in FIG. 9 is of simpler construction. It is recognized that there is now no ability to control the relative percentage of mass flow rate between the mass flow rate of air through floor supply duct inlet 33 and wall supply duct 66. It should be appreciated that in this embodiment, as in all other room air purifier embodiments described herein, that when a room air purifier unit 30 is placed in communication with a floor supply duct in a room, all other supply ducts that are not associated with a room air purifier are closed or sealed with a cover plate or other suitable sealing device.

Figure 10:
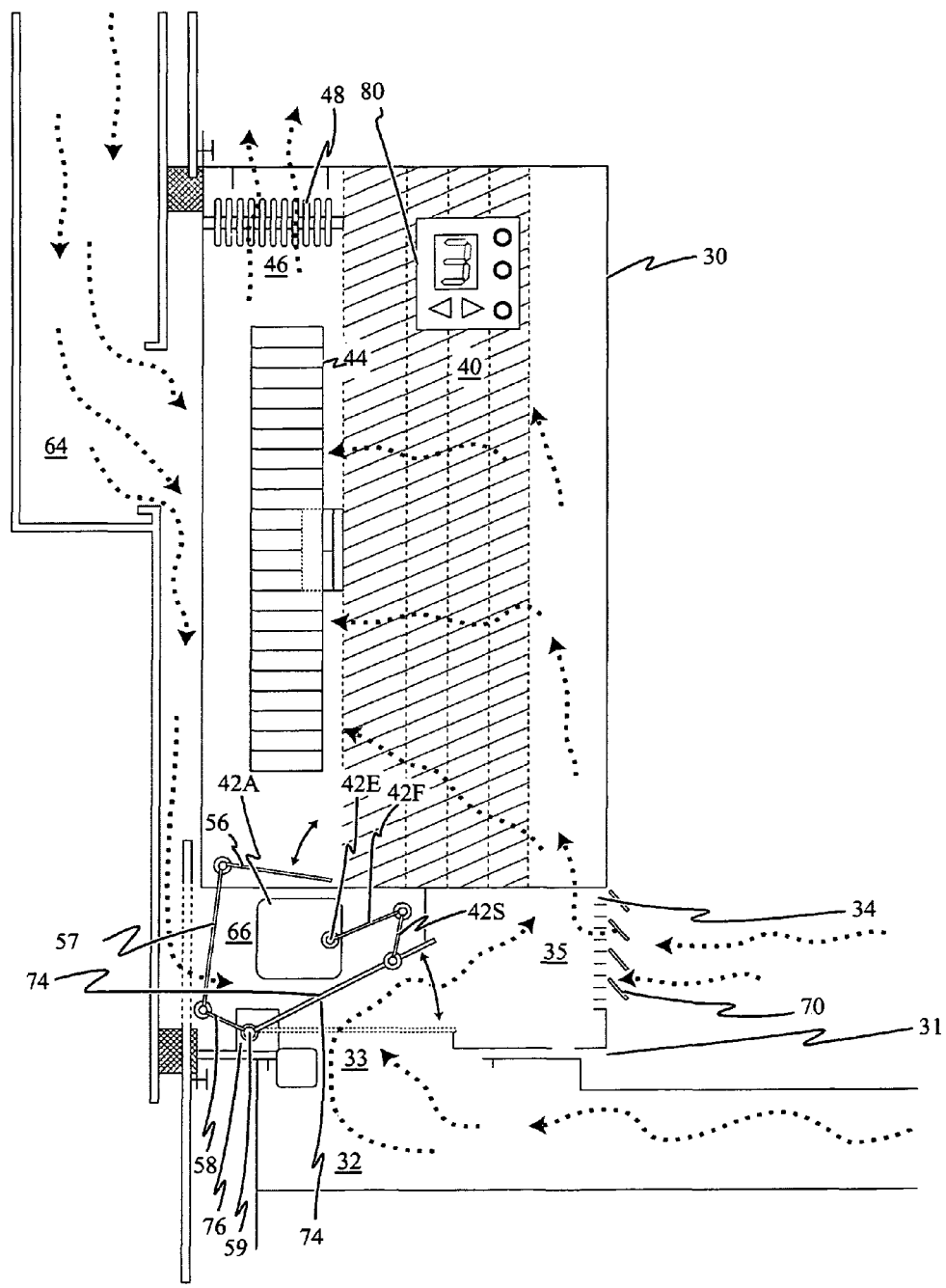
FIG. 10 is a side section view of fourth room air purifier embodiment employing a single supply duct and wall duct air inlet damper.

Referring now to FIG. 10, a fourth room air purifier embodiment of the present invention is shown. In this embodiment, the first damper 72 of FIG. 7 and associated mechanical elements are omitted. As a result, there is no damper control in this embodiment for the controller 80 to seal or close room air inlet 34. However, there is provided in this embodiment an adjustable louver 70, which manually and mechanically is manipulated by a user to partially restrict or completely close room air inlet 34 from the room ambient air. Similar to the embodiment shown in FIG. 7, described above, second damper 74 and associated mechanical elements adjust the relative percentages of mass flow rate entering through floor supply duct 33 and wall supply duct inlet 66.

Also shown in FIG. 10 is an optional, separate and independent mechanical damper actuator which can be employed in lieu of damper motor 42A and associated mechanical elements. In this alternative mechanical actuator, a sail element 56 is disposed on the exit side of filter 40 and connected to rod 57, which is itself connected to third rod 58. The other end of third rod 58 is positionally fixed onto limit stop pivot 59. Limit stop pivot 59 is also positionally fixed to second damper 74. In use, when fan 44 operates, air flow through filter 40 forces sail element 56, which is biased to a more vertical position (not shown), and the force of the air flow pushes sail 56 into a down position, as shown. Accordingly, rod 57 pushes third rod 58 down. By virtue of the fixation of third rod 58 to limit stop pivot 59, limit stop pivot 59 pivots to carry second damper 74 (which is positionally fixed also to limit stop pivot 59) up to open floor supply duct inlet 33.

Figure 11:
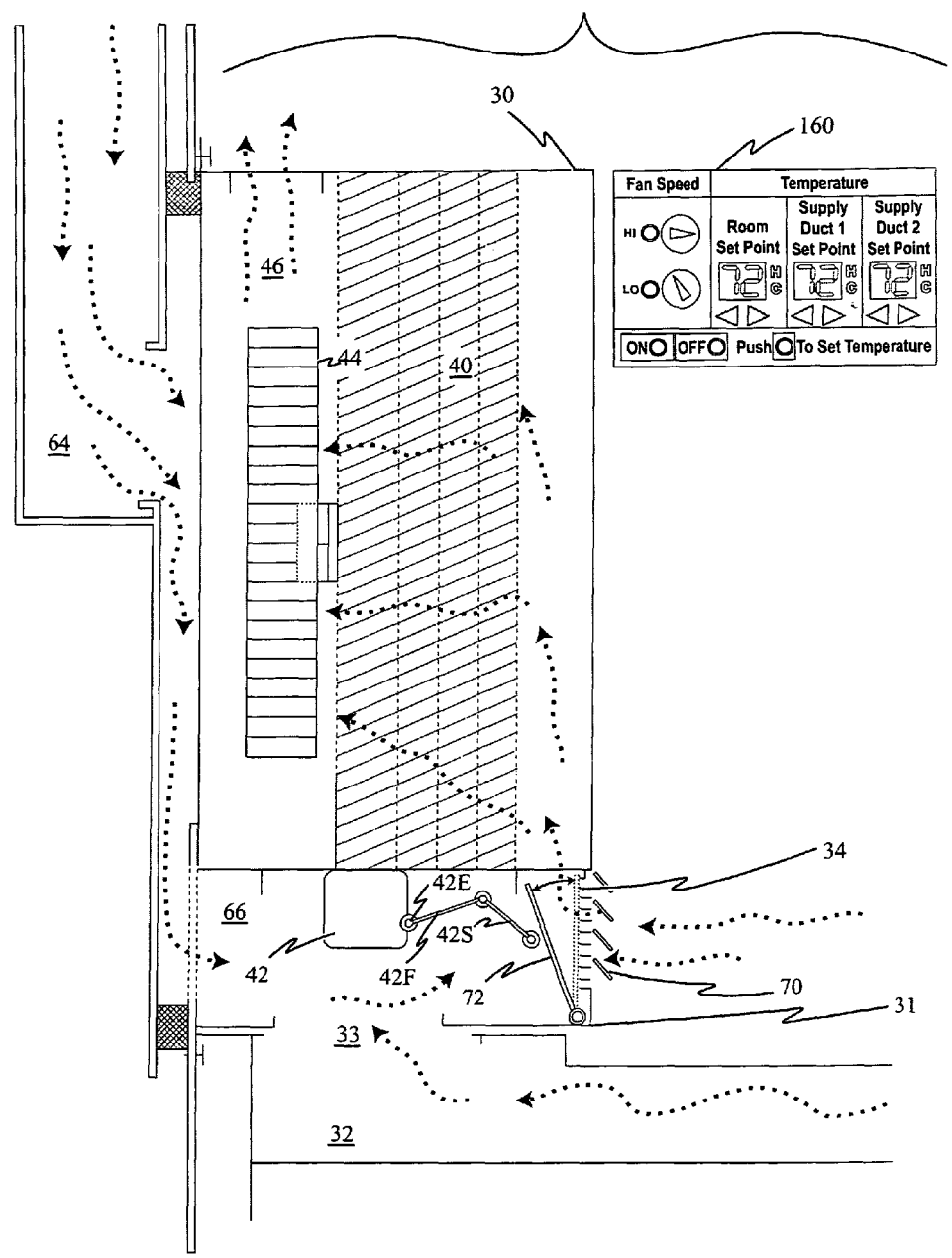
FIG. 11 is a side section view of a fifth room air purifier embodiment employing adjustable louvers for controlling air entering through a room air inlet and employing a single room air inlet damper.

Referring now to FIG. 11, which is a fifth room air purifier embodiment of the present invention, manually-adjusted louver 70 partially or fully restricts the mass flow rate of air entering room air purifier 30 through room air inlet 34. The first damper 72 shown in FIGS. 7 and 9 are also provided with this fifth embodiment. While already discussed above, position 1 of first damper 72 provides a crack opening so that air from chamber 35 may be drawn into room air purifier unit 30 to ensure positive pressure within the room, thus preventing outside unpurified air from entering the room. While not shown specifically in FIG. 11, an additional sail damper 56 (such as shown in FIG. 10) can also be added to manage two supply ducts 33, 66, preferentially to one another. It will also be appreciated that rather than a sail damper 56, the damper 74 shown in FIG. 7 could also be employed to manage the relative percentage of supply duct air flow through inlets 33 and 66 to provide temperature control, with then the difference between FIG. 11 and FIG. 7 being the addition of the manually-adjustable louver 70 in FIG. 11.

In an alternative embodiment, the sail damper 56 approach may also be used to actuate a safety feature. Specifically, if the fan power is off, and if the HVAC system forces air into the room air purifier 30, actuation of a sail damper 56 may be used to, for example, trigger a biased spring return or trigger a biased solenoid valve to close a damper over the supply duct inlet.

Referring now to FIG. 12, the control system 160 for the controller 80 shown in FIG. 7 is set forth. Identically to FIG. 8A, various diagnostic functions are completed in steps 162, 164, 170, 172, 174, 176, 178 and 182. Temperature readings are collected and evaluated in steps 163, 183 and 202. Based on these steps, thermostats 52, 60 and 62 may be turned on or off, according to steps 186, 190 and 204. In addition, auxiliary heating via heater 66 may be turned on or off in steps 180 and 184. Then, depending upon the evaluation of relative air temperature versus set point temperature performed in steps 188, 192, 206 and 208, first damper 72 and/or second damper 74 can each be selectively moved between position 1 and position 2, depending upon the command shown in steps 168, 194, 196, 198, 200, 210 and 212. Additionally, fan setting speeds are evaluated and corrected per the steps shown in FIGS. 214, 216, 218, 220, and 222. It should be appreciated that the fan speed settings also depend upon the Common Controller Rules discussed above.

Figure 13:
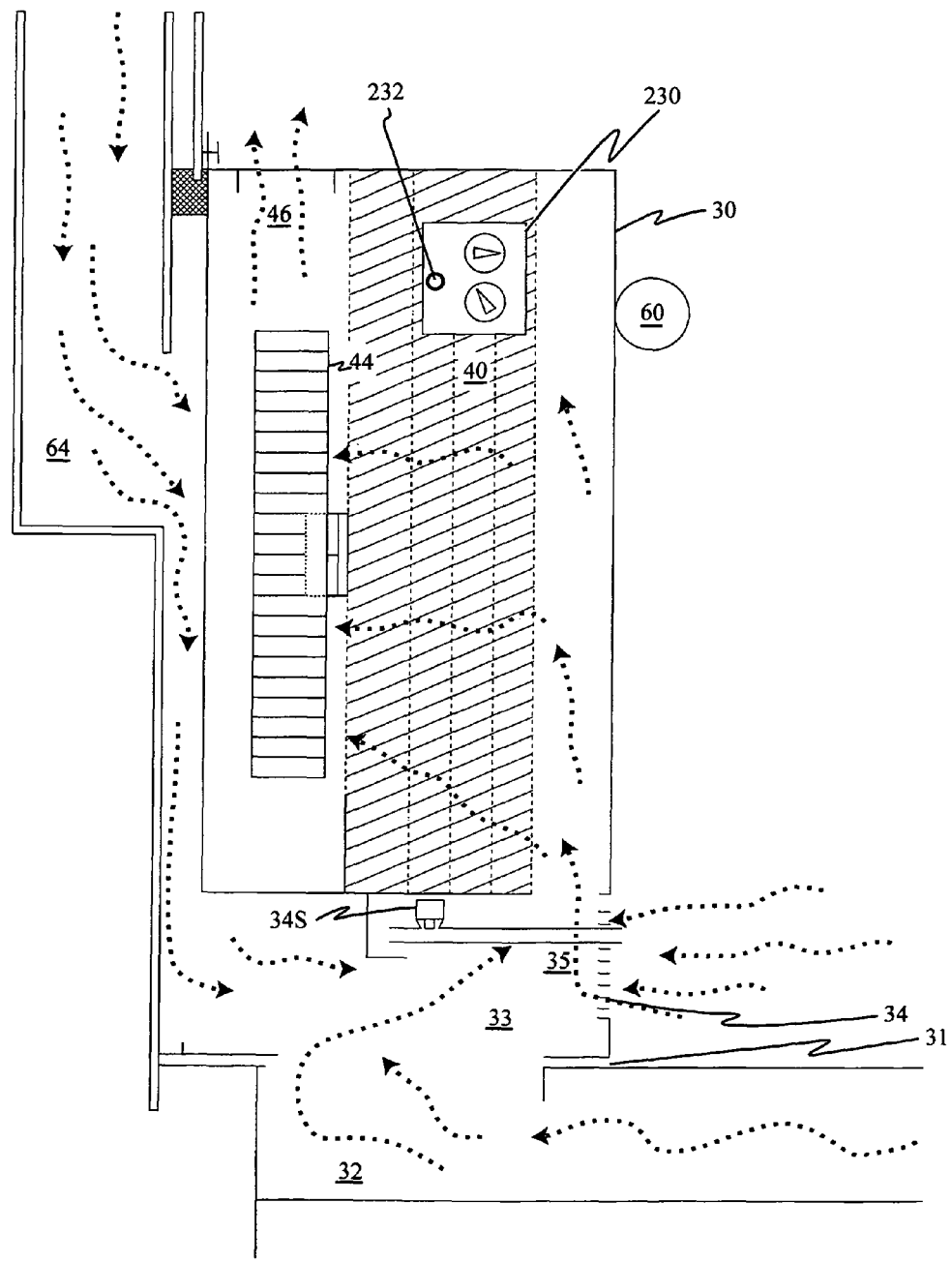
FIG. 13 is a side section view of a sixth room air purifier embodiment employing an air flow sensor.

Referring now to FIG. 13, a sixth alternate embodiment of the room air purifier 30 of the present invention is shown. In this embodiment, room air purifier 30 again communicates with wall supply duct 64 via wall supply duct inlet 66, floor supply duct 32 via floor supply duct inlet 33, and room air via room air inlet 34. In this embodiment no damper system for preferentially selecting the rate of air sourced from each inlet is provided. Room air purifier 30 is provided with a first temperature sensor 60 for sensing the ambient room air temperature, and a second room air temperature sensor 52 for sensing the resultant air temperature from the combination of air entering into chamber 35 through floor supply duct inlet 33 and wall supply duct inlet 66. In this situation it is extremely important, essential, that unpurified air be permitted to exhaust backwards from chamber 35 through room air inlet 34 into the room. One example of a negative or undesirable situation would be if the home HVAC system turns on and a large amount of forced air pushes through floor supply duct inlet 33 and exits into the room, untreated, via room air inlet 34. Accordingly, an air flow rate sensor 34S is provided. Sensor 34S measures the direction of air flow. Specifically, sensor 34S measures whether a desirable air flow, which means that air flows from the outside of room air purifier 30 to the interior housing of room air purifier 30, has been established. If this desirable air flow has been established, the pressure in chamber 35 will be generally negative.

If chamber 35 experiences a situation in which air flows within chamber 35 through sensor 34S in a direction exiting room air purifier 30, chamber 35 is receiving more air than the unit is discharging through outlet 46. In this undesirable situation, lamp 232 will light "ON" to provide a warning indicator. When this occurs, controller 230 will override the customer-selected fan speed setting and increase fan speed. The increase in fan speed results in fan 44 drawing a larger mass flow rate of air than is entering room air purifier 30 through floor supply duct inlet 33 and wall supply duct inlet 66.

Once the high fan speed is initiated by controller 230, sensor 34S will sense negative pressure within chamber 35, the desired pressure result. Unfortunately, once the HVAC system cycles off, sensor 34S will continue to report a favorable negative pressure situation within chamber 35, Accordingly, in order for the unit to respond to the environmental change of a lack of forced air being pushed by the HVAC system through supply duct inlet 33, a reset event is necessary to return room air purifier 30 to a lower fan speed consistent with the original customer-selected fan speed. The details regarding the method of engaging a higher fan speed and managing a reset event are provided in the control flow chart of FIGS. 14, 15 and 16. More specifically, the operation of automatically increasing fan speed based upon pressure readings based on Sensor readings provided by sensor 34S are shown in FIG. 14 at steps 252, 254, 256, 258, 260, 262, 232, 238, 240 and 242.

Controller 80 monitors heating or cooling cycle temperature changes associated with the cessation of forced air from the home HVAC system. Specifically, the controller, after verifying mode and collecting temperature information at steps 234, 236, 250, 270, 272, 274, 276 and 278, next determines whether a cooling cycle has been completed by detecting falling then rising temperatures (steps 280 and 282), or Simultaneously, controller 80 determines whether a heating cycle has been completed by detecting a rising then falling temperature in steps 284 and 286, thus indicating the completion of a heating cycle.

Figure 14:
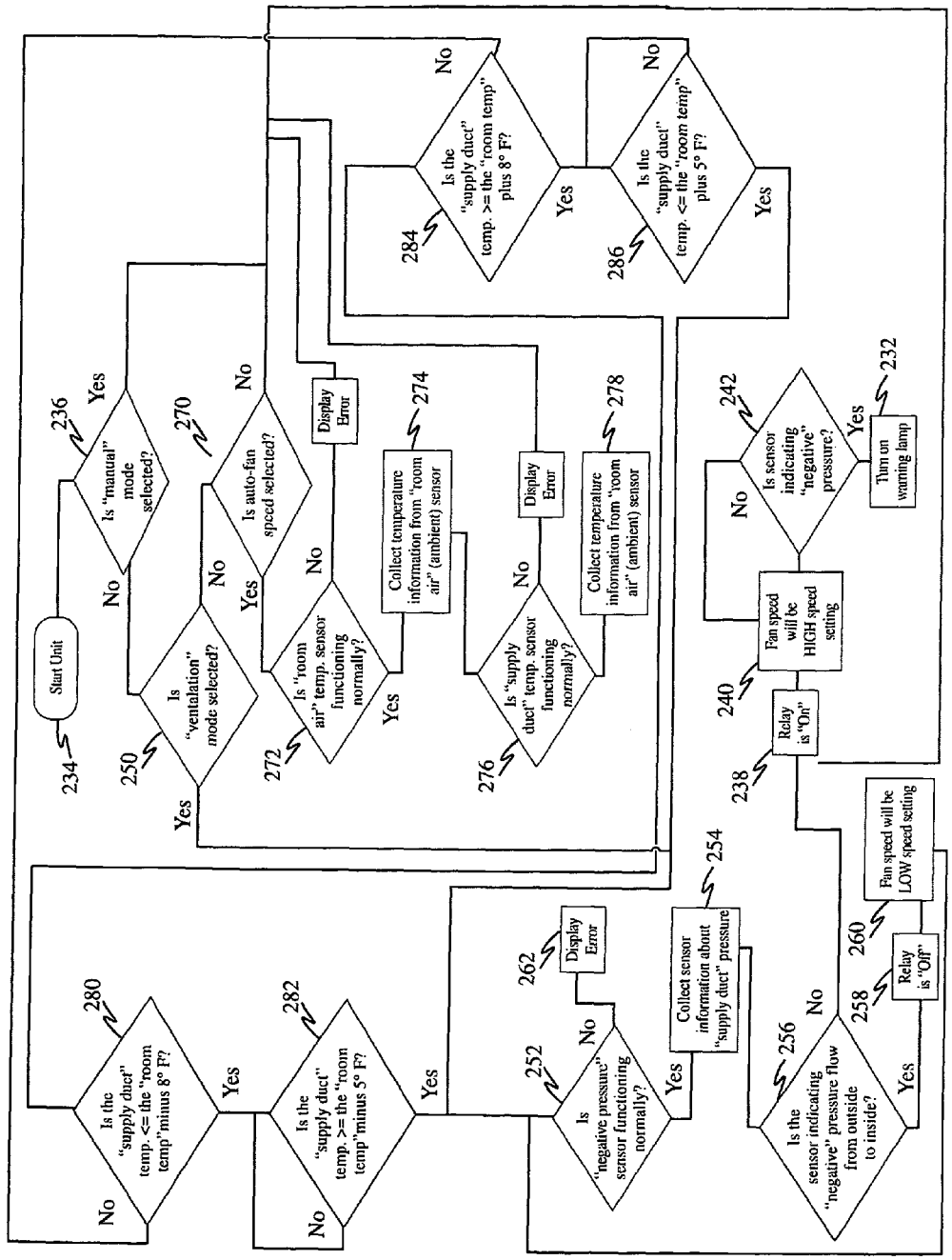
FIG. 14 is a flowchart for the controller in FIG. 13.

There are a number of additional observations on the control system shown in FIG. 14. Starting the unit in manual mode will result in operating the fan on a "high" setting, see steps 236, 238 and 240. If supply duct sensor 34S indicates insufficient negative pressure, step 242, a warning light 232 will turn on. The selection of automatic fan speed control, step 270, will delay fan start up until an HVAC system cycle has completed. At the end of a cycle, the fan speed is switched to a low setting preset by the customer if appropriate, step 260.

Figure 15:
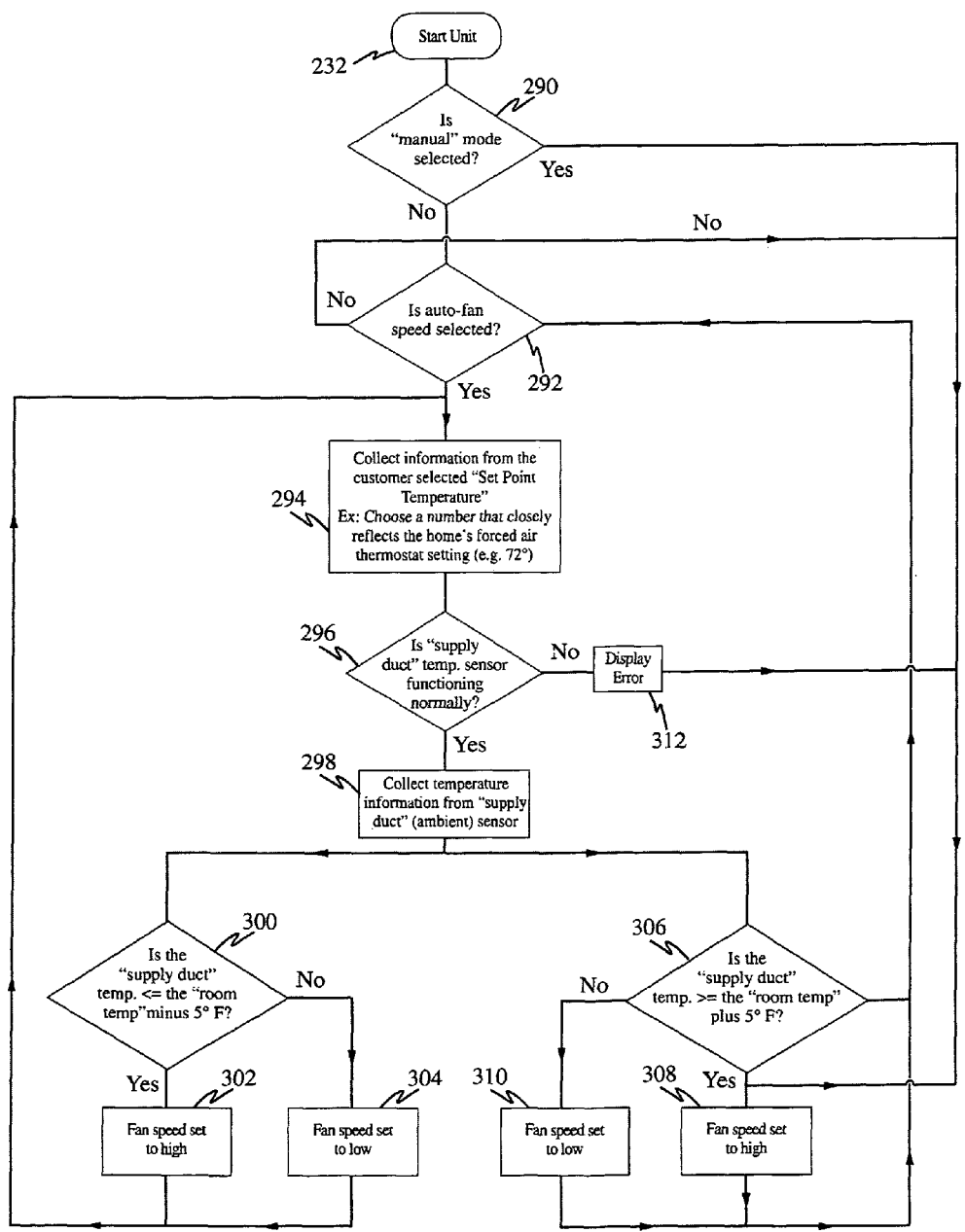
FIG. 15 is an alternative flowchart embodiment for the controller in FIG. 13.

Referring now to FIG. 15, an alternative controller algorithm is disclosed wherein the sixth embodiment in FIG. 13 is modified to provide only a single temperature sensor 52 disposed adjacent floor supply duct inlet 33. In a cooling cycle, if the supply duct temperature is less than or equal to the set point temperature minus 5° F., step 300, the fan speed is reduced, step 302. If not, then the fan speed may be increased, step 304. Alternatively, in a cooling cycle, if the supply duct temperature is greater than or equal to set point temperature plus 5° F., then the fan speed may be reduced, step 308. If not, the fan speed may be increased, step 310. This alternate control approach does require the user to select a set point that is relatively close to the set point temperature of the HVAC controller of the home. This approach also requires a relatively stable room temperature.

Throughout the various embodiments described herein, and especially with respect to the control systems, the reset, or attempt to reduce fan speed based upon a cessation of an HVAC system cycle, benefits the user by using less electricity, extending filter life, reducing noise, and extending the life of the fan 44 motor.

Figure 16:
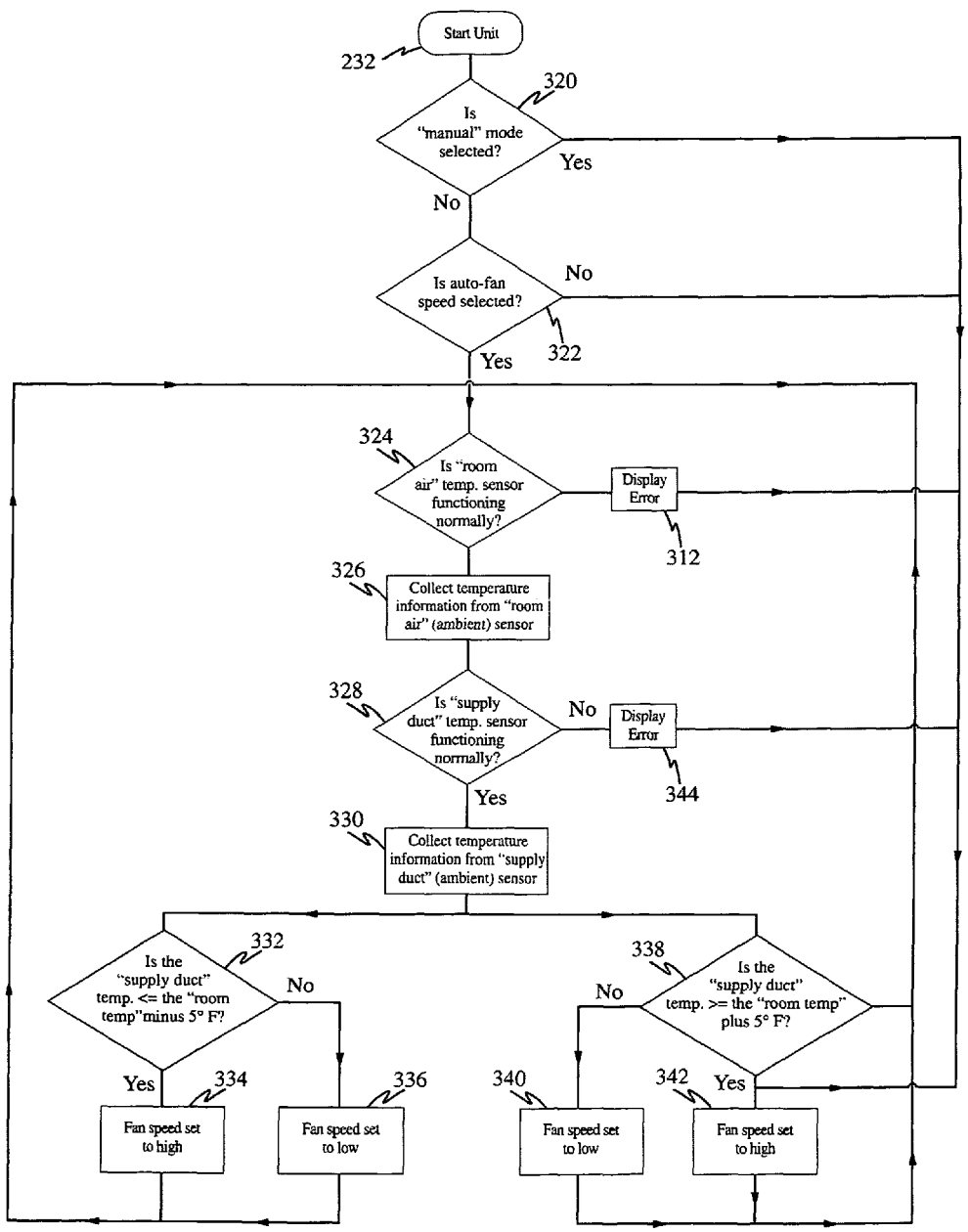
FIG. 16 is a second alternative flowchart embodiment for the controller in FIG. 14.
Figure 17:
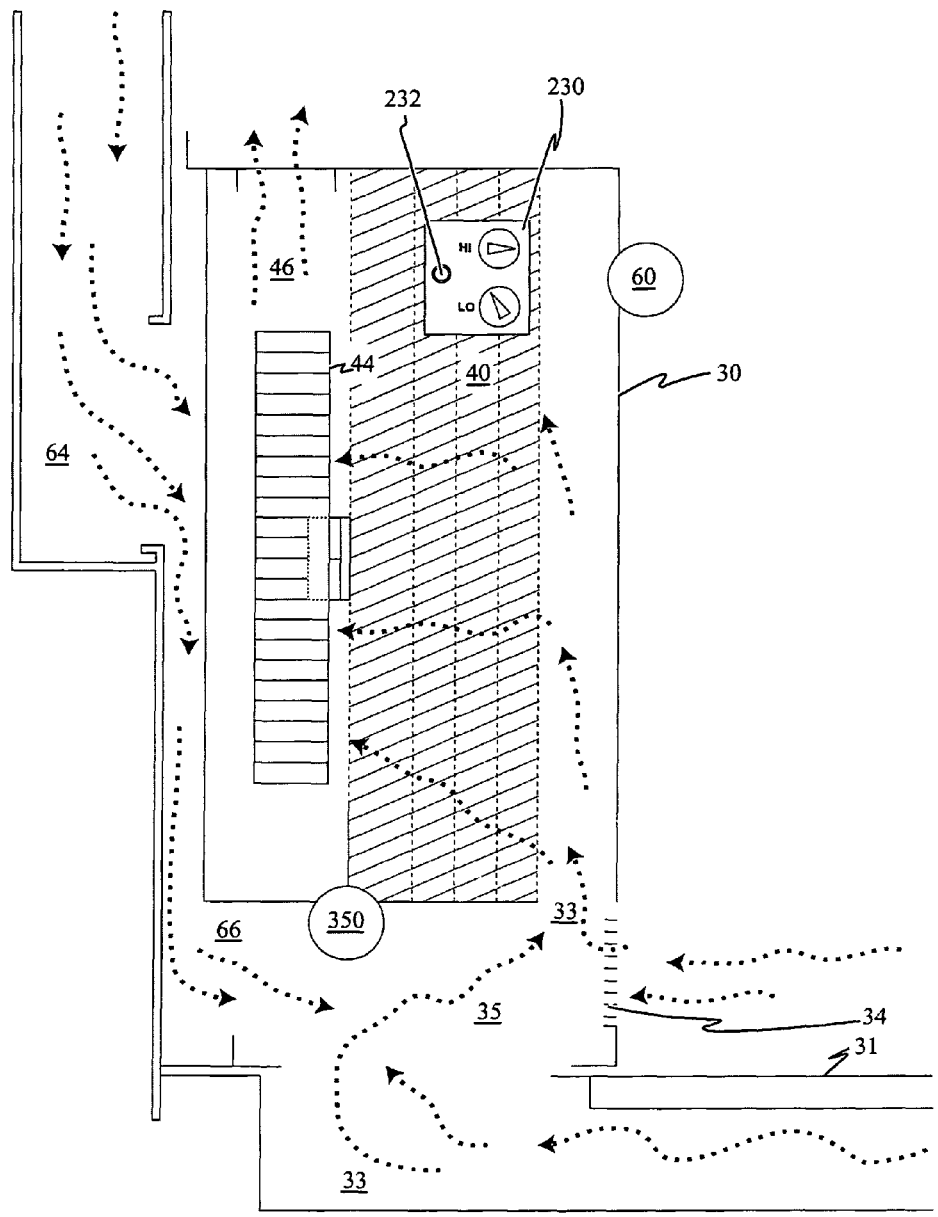
FIG. 17 is a side section view of a seventh room air purifier embodiment employing two temperature sensors.

Referring now to FIG. 16, a second alternative controller method is provided. This control system recognizes that the ambient room temperature is variable, thus requiring continuous temperature comparisons. In this algorithm the normal two-temperature-sensor arrangement shown in FIG. 17 applies, and no flow sensor 34S is necessary. It will be appreciated in this current approach that when a set point temperature value is exceeded by a difference between the room air temperature and supply duct air temperature the controller 80 will respond as though the HVAC system has been turned on, by raising the fan speed to "HIGH," steps 332, 334, 336, 338, 340 and 342.

Referring now to FIG. 18, there is provided another embodiment of a room air purifier 30 that coordinates with a central home HVAC controller 360. More specifically, an interface module 362 is placed in communication with a home HVAC controller 360. The communication may be accomplished by physically tapping interface module 362 into an output of HVAC controller 360 to detect a heating or cooling "on" or "off" signal sent by HVAC controller 360 to the home HVAC system. This information is sent by interface module 362 to a transmitter/receiver 363. Transmitter/receiver 363 sends this information to a room air purifier controller (e.g. 80, 160, 230, or the like). With this information, controller 80, 160, 230 determines whether to provide more heating or cooling depending on user-input set point, and whether to provide more fan speed based on user-input, decides to raises or lowers fan speed of fan 44 of room air purifier 30. It should be pointed out that while raising fan speed of fan 44 of room air purifier is dictated by the recognition in controller 80, 160, 230 that the HVAC controller 360 has initiated a heating or cooling phase, a higher fan speed of room air purifier 30 may already have been in existence due to the use of the sensors and user-input setpoint temperature and fan speed and methods of control previously discussed in detail above. Similarly, while the lowering of fan speed of room air purifier may be prompted by the recognition in controller 80, 160, 230 that the HVAC controller 360 has turned a heating or cooling cycle off, it is possible that the fan speed of room air purifier 30 may still remain "HIGH" due to the use of the sensors and user-input setpoint temperature and fan speed and methods of control previously discussed in detail above.

Thus, under normal operating conditions and user-designated setpoint temperature and/or fan speed settings, the moment the central HVAC system is turned on, room air purifier 30 responds without delay, without sensors, without timers and without complex temperature and sensor readings and predictive software algorithms.

Referring now to FIGS. 19A, 19B, and 19C, the reverse approach from that of FIG. 18 is presented. In FIGS. 19A, 19B, and 19C, a standard HVAC thermostat 360 (which may be wired or wireless) can be placed in the same room as room air purifier 30. Then, standard HVAC thermostat 360, which may be wired or wireless, is placed in wired (FIG. 19A) or wireless (FIG. 19B) communication with interface module 362. In operation, controller 80, 160, 230 of room air purifier 30 uses user input setpoint temperature and fan speed to determine whether to raise or lower the temperature in the room, and whether to raise or lower fan speed. To carry out changes in temperature and/or fan speed, controller 80,160, 230 relays commands to HVAC controller 360 through transmitter/receiver 363, which are forwarded to wired interface module 362 (FIG. 19A) or wireless interface module (FIG. 19B), which are then sent to HVAC controller 360. In this manner, the room in which room air purifier 30 is located can be heated or cooled preferentially to other rooms in the house.

With the thermostat control in the same room as the room air purifier, a single room air purifier may become more capable of heating or cooling a room where multiple supply ducts are installed and normally used and/or required for routine heating and cooling.

Even with all other supply ducts sealed, the room air purifier is now capable of managing the desired room temperature requirements.

With respect to FIG. 19C, the function of HVAC thermostat 360 and interface module 362 are combined into a single, new HVAC thermostat 366. Accordingly, controller 80, 160, 230 of room air purifier 30 may transmit commands to the HVAC controller via transmitter receiver 363 without the need of a separate interface module box.

Figure 20:
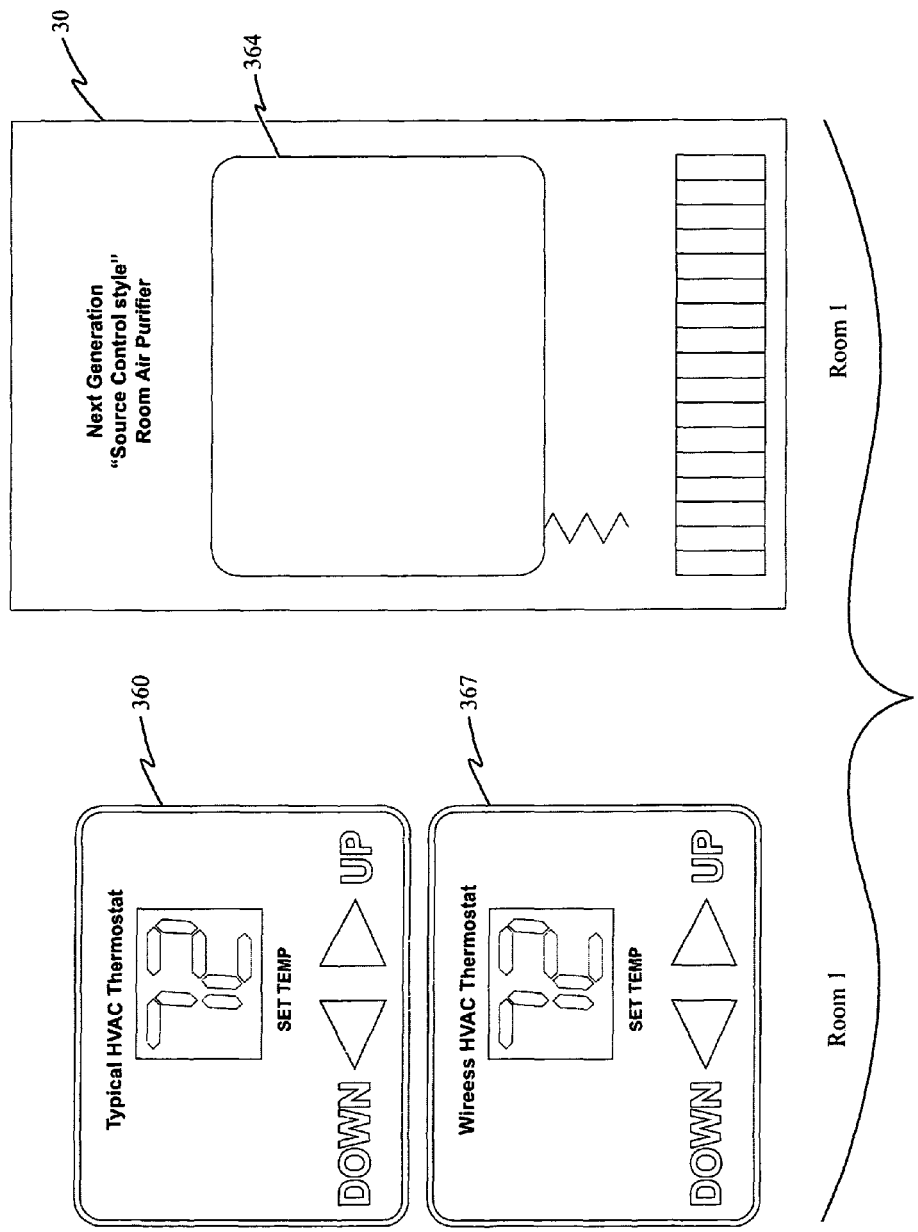
FIG. 20 is a block diagram in which a wireless controller is set to mimic a main controller setting, and in which a room air purifier of the present invention can receive signals sent from the wireless controller.

With respect to FIG. 20, there are various wireless HVAC thermostats 367 commercially available. Wireless thermostat HVAC 367 may be placed in any location of the house and control the operation of the home HVAC system. In use, wireless HVAC thermostat 367 sends commands to a receiver located at the HVAC system. In FIG. 20, a commercially available wireless HVAC thermostat 367 is mounted proximate standard HVAC controller 360. The temperature set point of both wired HVAC thermostat 360 and wireless HVAC thermostat 367 are identical. Room air purifier 30 is disposed in a room remotely located from HVAC controller 360 and wireless HVAC thermostat 367. Room air purifier 30 is provided with a wireless thermostat receiver 364. Wireless thermostat receiver 364 is in communication with controller 30, 160, 230 or room air purifier 30. Accordingly, controller 80, 160, 230 of room air purifier 30 receives information from wireless HVAC thermostat 367. Specifically, room air purifier 30 will be informed of any command to begin or cease a heating or cooling cycle. Based upon this information, room air purifier 30 may increase or decrease fan speed. It is recognized that the actual heating or cooling cycle of the home is controlled by the pre-existing wired HVAC controller 360. However, placement of the wireless HVAC thermostat 367 adjacent the wired HVAC controller 360 provides a close timing approximation and predictor for when the HVAC system will turn on or off, and therefore will assist controller 80, 160, 230 in determining whether to raise or lower the fan speed of fan 44.

Figure 21:
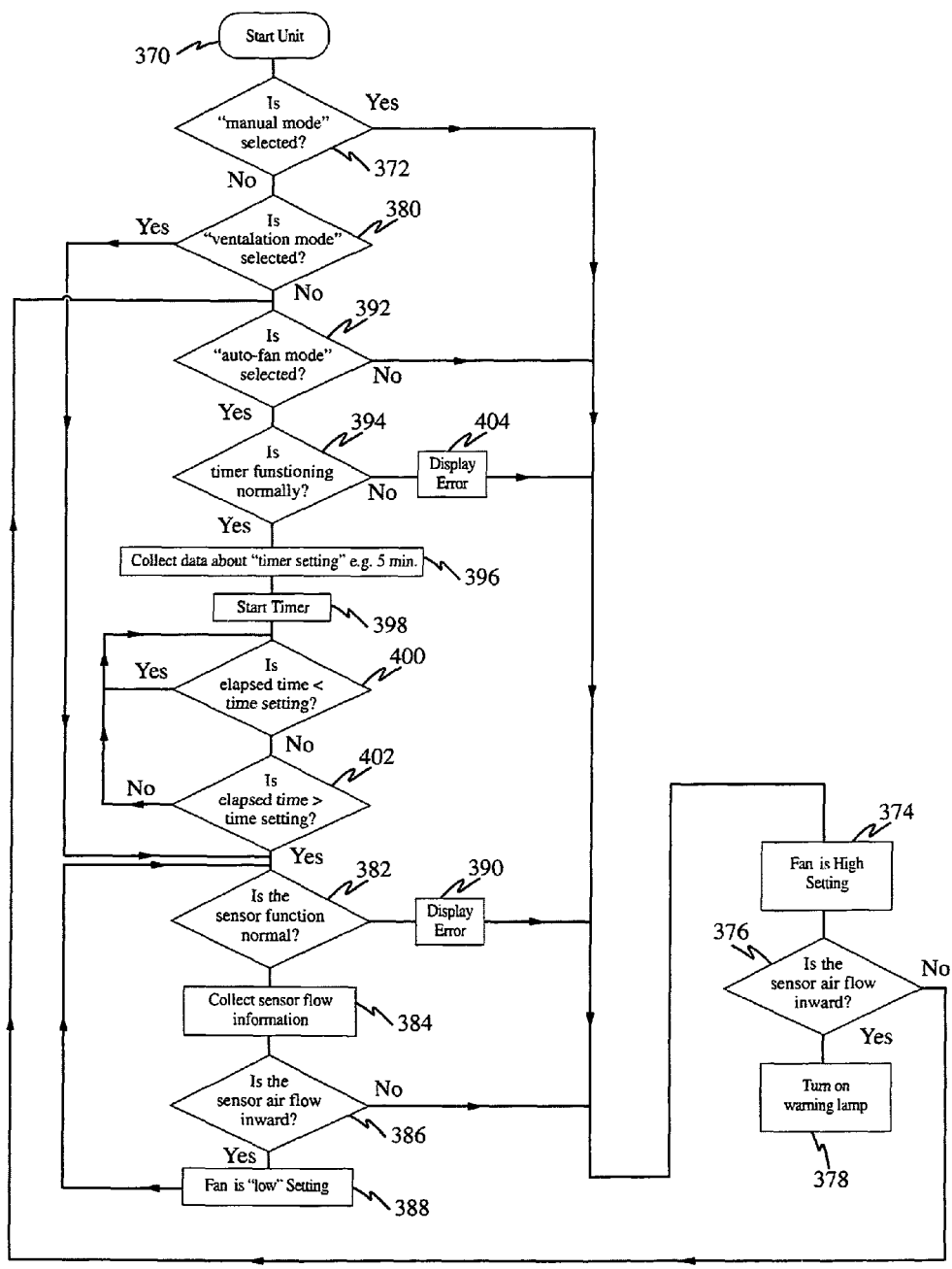
FIG. 21 is a flow diagram illustrating a timer method of control of a controller for a room air purifier of the present invention.

With respect to FIG. 21, an alternate method of controlling fan speed is disclosed. In this algorithm, a timer is used to trigger a reset of evaluation of the mass flow rate of air entering through supply duct air inlet 33, and further enables a return from a higher fan speed setting to a lower fan speed setting.

As recognized above, flow sensor 34S will always report favorable positive air pressure conditions in the room from a negative pressure in chamber 35 after fan speed of fan 44 has been set to a high setting. Therefore, the approach of the algorithm of FIG. 21 is to provide a timer-initiated reset to allow room air purifier to return to a lower fan speed. In operation, a user sets a default amount of time for high fan speed, step 396. Accordingly, when controller 80, 160, 230 recognizes and initiates a higher fan speed, a timer is started, step 398. After the time has elapsed, step 400, 402, the sensor 34S is reset (steps 382, 384). Upon evaluation, steps 376, 386, fan speed may be adjusted, steps 374, 388.

Figure 22:
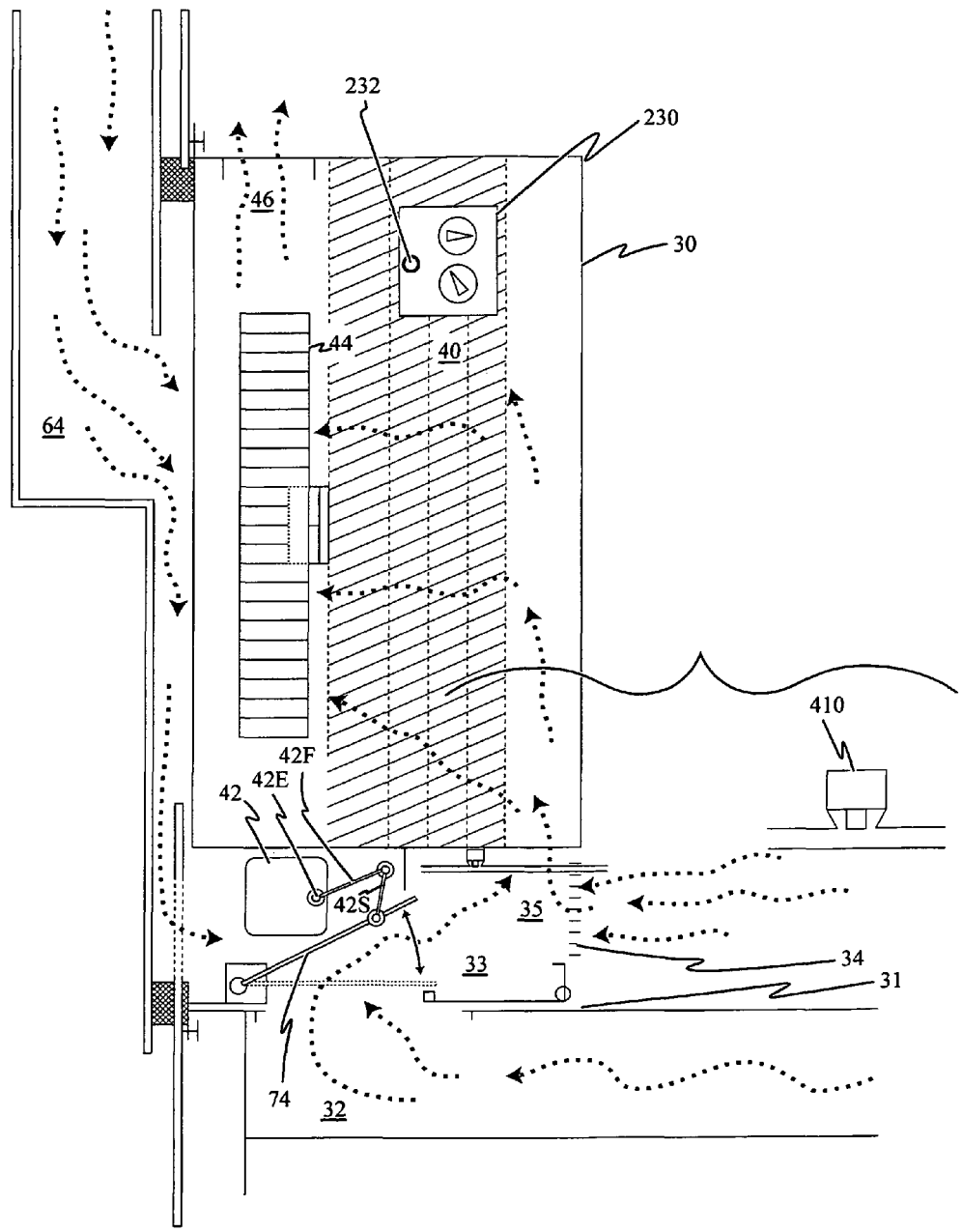
FIG. 22 is a side section view of an eighth room air purifier embodiment employing a flow sensor and damper motor.
Figure 23:
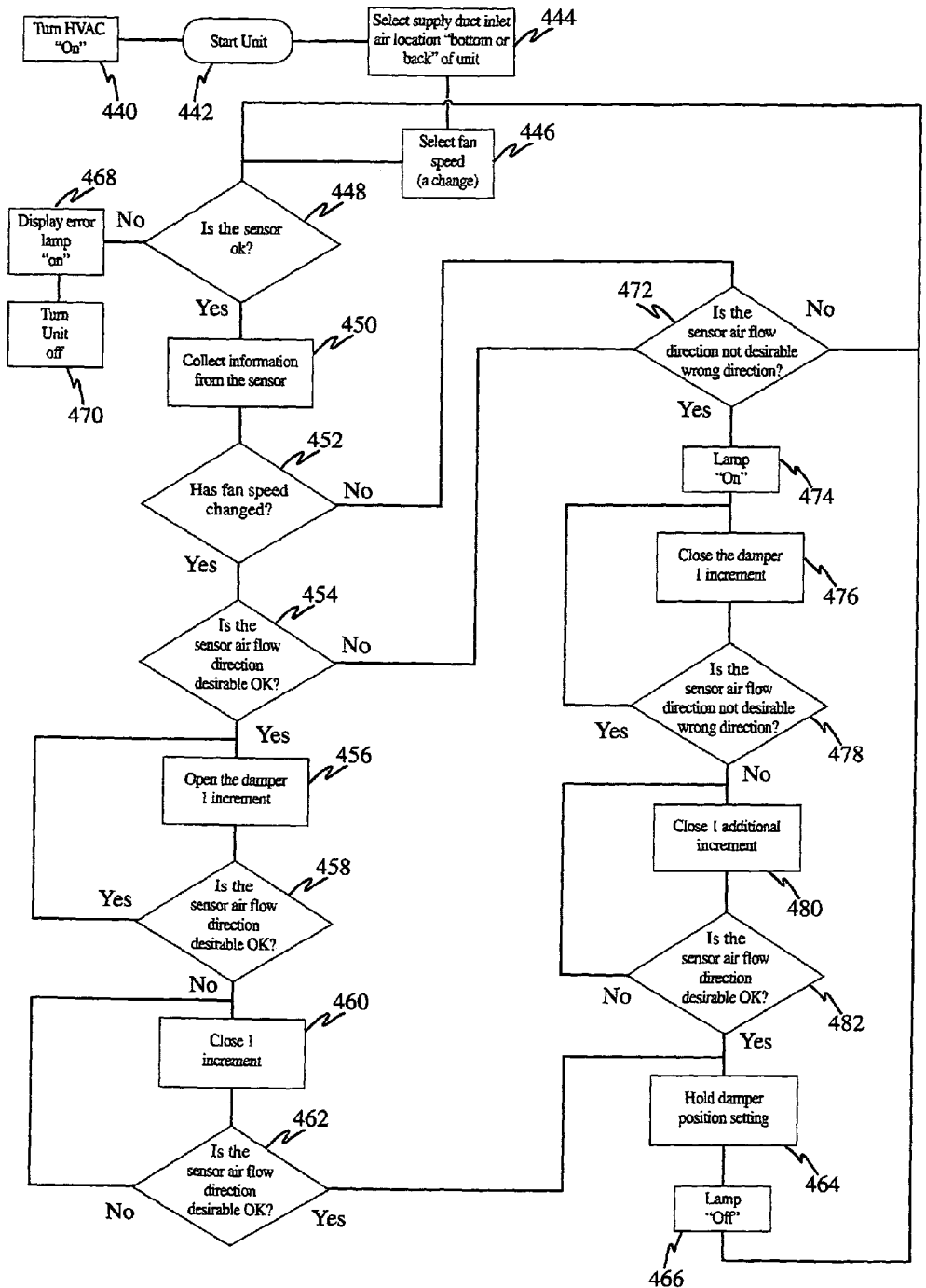
FIG. 23 is a flow diagram of for the operation of the controller of FIG. 22.

Referring now to FIGS. 22 and 23, flow sensor 410 is used to facilitate control of the position of damper 74 of room air purifier 30. Specifically, flow sensor 410 is disposed within chamber 35 to determine the direction of air flow, step 450. This data is evaluated, steps 454, 472. Depending upon whether the direction of air flow is desirable, damper 74 may be either opened or closed incrementally (steps 456, 476), and this process is repeated (steps 456, 458, 460, 462, 476, 478, 480, 482), until the ideal damper position has been achieved (step 464).

Figure 24A:
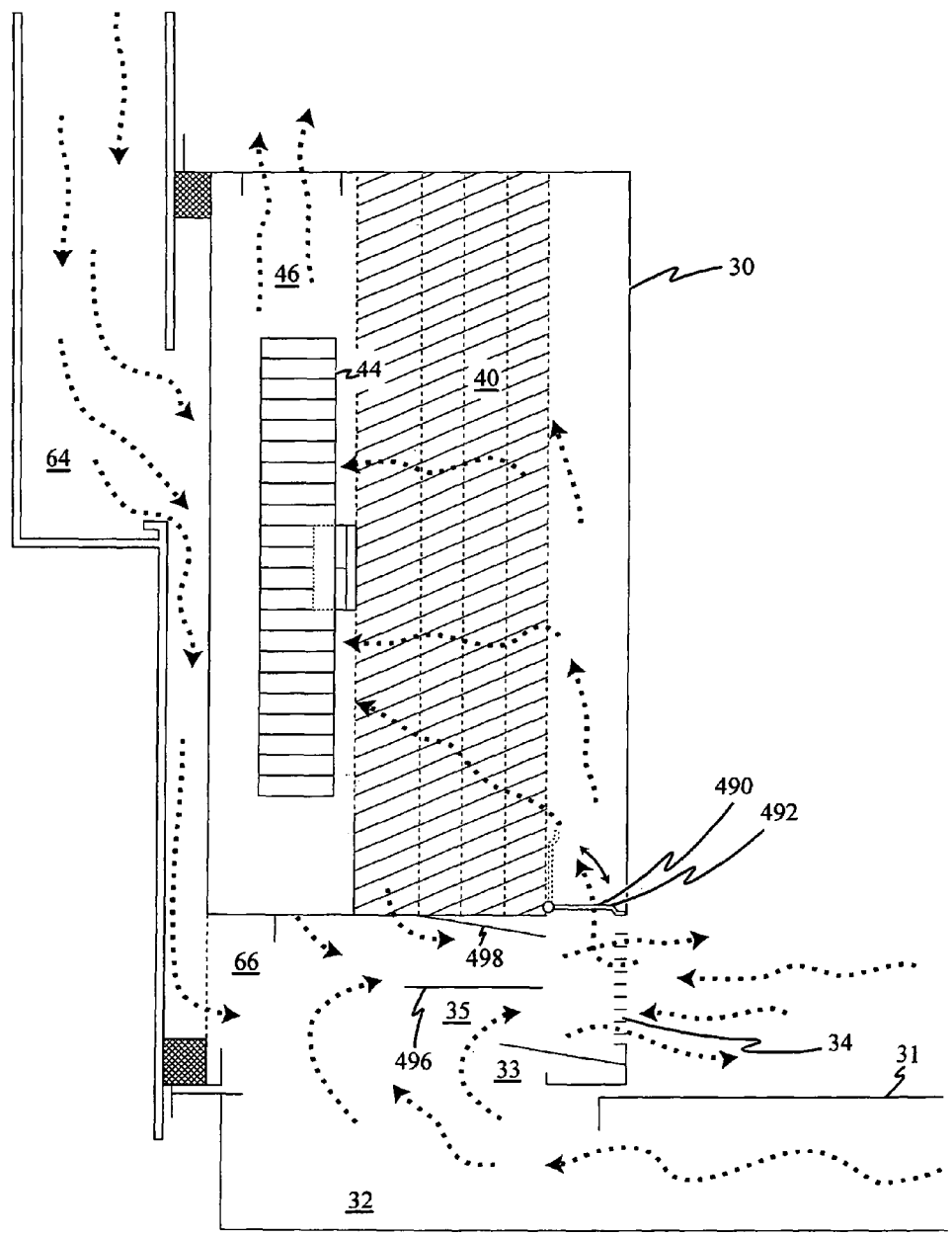
FIG. 24A is a side schematic view of a ninth room air purifier embodiment of the present invention utilizing air flow redirection.

Referring now to FIG. 24A, there is provided a safety system. The goal of the embodiment of the room air purifier 30 of FIG. 24A is to prevent contaminants disposed on the face of filter 40 from entering the room in the event that fan 44 is turned off or is otherwise not operating. In this situation, because fan 44 is non-operational, it is important for untreated air flowing from supply duct inlet 33 to be prevented from creating turbulence against the face of filter 40 thereby dislodging contaminants disposed on the face of filter 40, which contaminants would drop and exit into the room via room air inlet 34. Accordingly, room air purifier 30 is provided with a first partition 494, a second partition 496 and a third partition 498. It is appreciated that more than three partitions may be used. In the present embodiment, the inlet defined by the distance between first partition 494 and second partition 496 and the inlet defined by the distance between the second partition 496 and the third partition 498 must each be larger in size than the size of the outlets defined by first partition 494 and second partition 496, and that between second partition 496 and third partition 498. Because the outlets are smaller than the inlets the air exiting room air purifier through room air inlet 34 has a higher velocity than the air entering the inlets. The increased air velocity of the expelled air prevents air from flowing in a different direction, namely, upward toward the face of filter 40.

An optional damper 490 may be provided at the base of filter 40. Damper 490 is provided at one end with an angled air director 492. When fan 44 is operational, the fan draws or lifts air up through chamber 35 and through filter 40. When the fan is powered off or non-functional damper 490 drops pursuant to gravity to prevent the flow of air toward the face of filter 40. In addition, angled air director 492 helps to divert turbulent air away from filter 40 and toward room air inlet 34. A latch for damper 490 may also be provided to allow the customer to physically prevent upward movement of damper 490.

Now, referring to FIG. 24B, there is provided a structure for evenly distributed air flow across the face of filter 40. In this embodiment, a solid air flow partition 500 is provided to split the flow of air into two channels.

On a side note, it should be recognized that, just as in FIG. 1, a damper 43 may be alternatively placed at the bottom of solid air flow partition 500. In addition, just as in FIG. 1, solid air flow partition 500 of FIG. 24B may be hinged at the top in lieu of the use of a hanging damper.

Resuming the discussion of FIG. 24B, prior to encountering the channels formed by air flow partition 500 air must pass through first damper 504A and second damper 504B. These dampers perform the identical function as the optional damper 490 in FIG. 24A. Second damper 504B is adapted to open before first damper 504A to ensure that a first damper 504A maintains a proper seal when fan 44 fails to operate. This preferential order of opening may be accomplished by a variety of methods. For example, second damper 504B may be constructed of a lighter material than the material of first damper 504A. In another example second damper 504B may be provided with more surface area than the surface area of first damper 504A. In another example, shown in FIG. 24C, second damper 504B may be provided with an air foil 502 for enhancing lift.

With respect to FIG. 24B, an alternative embodiment completely omits second damper 504B. In this alternative embodiment, the right side channel is not obstructed by a matched damper, although it should be noted that the previous discussion regarding providing a hinge or pivot at the top of air flow partition 500, or providing a swinging damper 43 (as employed in FIG. 1) is also within the scope of the present invention. Therefore, air must travel up the right side of air flow partition 500, around the top and to the left side of air flow partition 500 before encountering the face of filter 40. Any debris or contaminants loosened from any turbulence are safely prevented from entering the room by the closure of damper 504A.

It should be appreciated that a simple horizontal sliding panel (not shown) may be used in lieu of dampers 504A and 504B to extend over the same area to provide a complete mechanical block. Such a sliding panel may be customer-positioned, driven by motor, driven by linear actuator, etc.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, a drip tray and water sensor are not shown. However, the location of such is dictated by gravity and therefore these items would naturally be located at the base of room air purifier 30. The water sensor, when activated, activates an alarm and also may require various dampers to return to an original or first position.

Thus, the breadth and scope of the present invention should not be limited by any of the above-described exemplary embodiments, but should be defined only in accordance with the following claims appended hereto and their equivalents.

What is claimed is:

1. A room air purifier comprising:
    a housing having a floor supply duct inlet, a room air inlet, and an outlet;
    an air mixing chamber disposed in said housing and in direct communication with said room air inlet and said floor supply duct inlet;
    a filter disposed in said housing, having an inlet side and an outlet side;
    a fan disposed in said housing on said outlet side of said filter;
    a filter inlet area disposed between said air mixing chamber and said inlet side of said filter; and
    an air distribution panel disposed in said filter inlet area, spaced between the wall of said housing and said filter, wherein said air distribution panel further defines apertures therethrough for allowing air to pass.

2. A room air purifier according to claim 1, wherein said apertures of said air distribution panel are adapted to alter the distribution of mass flow rate of air across the face of said filter.

3. A room air purifier according to claim 1, further comprising:
    a damper pivotally connected to said air distribution panel, and extending towards said air mixing chamber, said damper having said extended end movable between a first position near the wall of said housing and a second position near said filter.

4. A room air purifier according to claim 3, wherein said air distribution panel is disposed adjacent said filter such that all air arriving at the face of said filter passes through one side of said air distribution panel.

5. A room air purifier according to claim 1, further comprising:
    a plurality of flow sensors disposed within said housing near said outlet side of said filter for providing air flow rate information at various locations near said outlet side of said filter.

6. A room air purifier according to claim 1, further comprising:
    a damper pivotally disposed between said filter and said air distribution panel, said damper being biased to a closed position.

7. A room air purifier according to claim 6, wherein said damper is pivotally attached on an end proximate said filter, and is adapted to be longer than the width between said air distribution panel and said filter, thereby enabling gravity to bias said damper to a closed position.

8. A room air purifier comprising:
    a housing having a floor supply duct inlet, a room air inlet, and an outlet;
    an air mixing chamber disposed in said housing and in direct communication with said room air inlet and said floor supply duct inlet;
    a filter disposed in said housing, having an inlet side and an outlet side;
    a fan disposed in said housing on said outlet side of said filter;
    a filter inlet area disposed between said air mixing chamber and said inlet side of said filter; and
    an air distribution panel disposed in said filter inlet area, spaced between the wall of said housing and said filter, said air distribution panel having a proximal end extending towards said air mixing chamber, and a distal pivoting end.

9. A room air purifier according to claim 8, wherein said air distribution panel further defines apertures therethrough for allowing air to pass.

10. A room air purifier according to claim 8, wherein said proximate end of said air channel panel is movable between a first position near the wall of said housing and a second position near said filter.

11. A room air purifier according to claim 8, further comprising:
    a plurality of flow sensors disposed within said housing in said filter inlet area, said plurality of flow sensors being spaced apart and disposed near the face of said inlet side of said filter for providing air flow rate information at various locations near the face of said filter.

12. A room air purifier according to claim 8, further comprising:
    a plurality of flow sensors disposed within said housing near said outlet side of said filter for providing air flow rate information at various locations near said outlet side of said filter.

13. A room air purifier comprising:
    a housing having a floor supply duct inlet, a room air inlet, a wall supply duct inlet, and an outlet;

an air mixing chamber disposed in said housing and in direct communication with said room air inlet, said wall supply duct inlet, and said floor supply duct inlet;
a filter disposed in said housing, having an inlet side and an outlet side;
a fan disposed in said housing on said outlet side of said filter;
a filter inlet area disposed between said air mixing chamber and said inlet side of said filter;
a first damper assembly having a first damper, a first linkage, and a first damper motor, wherein said damper is pivotally connected to said linkage, and wherein said damper may be pivoted from a first position opening said room air inlet to a second position closing said room air inlet.

14. A room air purifier according to claim 13, wherein damper is a spring return damper.

15. A room air purifier according to claim 13, further comprising:
a wall duct supply inlet temperature sensor disposed in said wall duct supply inlet; a supply duct inlet temperature sensor disposed in said supply duct inlet; and an ambient room temperature sensor disposed in said room air inlet.

16. A room air purifier according to claim 13, further comprising:
a linear actuator connected to said first damper assembly, biased to return said first damper into a first position upon the loss of function of said first damper motor.

17. A room air purifier according to claim 13, further comprising:
a second damper assembly having a second damper, a second linkage, and a second damper motor, wherein said damper is pivotally connected to said linkage, and wherein said damper may be pivoted from a first position closing said supply duct inlet to a second position closing said wall supply duct inlet.

18. A room air purifier comprising:
a housing having an elevated floor base, a floor supply duct inlet, a room air inlet, a wall supply duct inlet, and an outlet;
an air mixing chamber disposed in said housing and in direct communication with said room air inlet, said wall supply duct inlet, and said floor supply duct inlet;
a filter disposed in said housing, having an inlet side and an outlet side;
a fan disposed in said housing on said outlet side of said filter;
a filter inlet area disposed between said air mixing chamber and said inlet side of said filter; and
a sail damper assembly having a sail element pivotally connected at a first end to said elevated floor base adjacent an outlet of said filter, a first damper pivotally connected at a first end to a second end of said sail element, a third bar pivotally connected at a first end to a second end of said first damper, said third bar being fixedly connected at a second end to a pivot, wherein said sail element is biased to partially obstruct an expected direction of flow of air exiting said outlet of said filter, and whereby a flow of air exiting said outlet of said filter will rotate said sail element down to thereby rotate said first damper to close said wall supply inlet.

19. A room air purifier according to claim 18, further comprising:
a second damper element fixedly connected to said pivot;
whereby rotation of said pivot due to rotation of said sail element also rotates said second damper element to open said floor supply duct inlet.

20. A room air purifier comprising:
a housing having a floor supply duct inlet, a room air inlet, and an outlet;
an air mixing chamber disposed in said housing and in direct communication with said room air inlet and said floor supply duct inlet;
a filter disposed in said housing, having an inlet side and an outlet side;
a fan disposed in said housing on said outlet side of said filter;
a filter inlet area disposed between said air mixing chamber and said inlet side of said filter;
an air distribution panel disposed in said filter inlet area, spaced between the wall of said housing and said filter; and
a damper pivotally connected to said air distribution panel, and extending towards said air mixing chamber, said damper having said extended end movable between a first position near the wall of said housing and a second position near said filter,
wherein said damper may be moved between said first position and said second position using at least one means selected from the following: a motor, a manually-actuated lever.

21. A room air purifier according to claim 20, wherein said air distribution panel is disposed adjacent said filter such that all air arriving at the face of said filter passes through one side of said air distribution panel.

22. A room air purifier according to claim 20, wherein said air distribution panel is solid.

23. A room air purifier comprising:
a housing having a floor supply duct inlet, a room air inlet, and an outlet;
an air mixing chamber disposed in said housing and in direct communication with said room air inlet and said floor supply duct inlet;
a filter disposed in said housing, having an inlet side and an outlet side;
a fan disposed in said housing on said outlet side of said filter;
a filter inlet area disposed between said air mixing chamber and said inlet side of said filter;
an air distribution panel disposed in said filter inlet area, spaced between the wall of said housing and said filter; and
a plurality of flow sensors disposed within said housing in said filter inlet area, said plurality of flow sensors being spaced apart and disposed near the face of said inlet side of said filter for providing air flow rate information at various locations near the face of said filter.

24. A room air purifier according to claim 23, further comprising:
a damper pivotally disposed between said filter and said air distribution panel, said damper being biased to a closed position.

25. A room air purifier according to claim 24, wherein said damper is pivotally attached on an end proximate said filter, and is adapted to be longer than the width between said air distribution panel and said filter, thereby enabling gravity to bias said damper to a closed position.

* * * * *